United States Patent

Nishihara et al.

[11] Patent Number: 5,900,446
[45] Date of Patent: May 4, 1999

[54] AROMATIC POLYCARBONATE-STYRENE POLYMER RESIN COMPOSITION

[75] Inventors: Hajime Nishihara, Yokohama; Akihiro Watanabe, Shinagawa-ku, both of Japan

[73] Assignee: Asahi Kasei Kogyo Kabushiki Kaisha, Osaka, Japan

[21] Appl. No.: 08/700,368

[22] PCT Filed: Jun. 21, 1995

[86] PCT No.: PCT/JP95/01235

§ 371 Date: Aug. 26, 1996

§ 102(e) Date: Aug. 26, 1996

[87] PCT Pub. No.: WO95/35346

PCT Pub. Date: Dec. 28, 1995

[30] Foreign Application Priority Data

Jun. 21, 1994 [JP] Japan ..................................... 6-138962

[51] Int. Cl.$^6$ ............................. C08L 69/00; C08L 25/12; C08L 51/04
[52] U.S. Cl. ............................. 524/127; 524/141; 525/67; 525/133; 525/53; 526/65; 526/73; 526/342
[58] Field of Search .................................... 524/127, 141; 525/53, 67, 133

[56] References Cited

U.S. PATENT DOCUMENTS

| | | | |
|---|---|---|---|
| 4,141,934 | 2/1979 | Wingler | 525/53 |
| 4,742,115 | 5/1988 | Mawatari | 525/68 |
| 4,748,203 | 5/1988 | van Abeelen et al. | 525/67 |
| 4,983,658 | 1/1991 | Kress et al. | 524/141 |
| 5,204,394 | 4/1993 | Gosens et al. | 524/125 |
| 5,393,836 | 2/1995 | Niessner | 525/67 |

FOREIGN PATENT DOCUMENTS

| | | | |
|---|---|---|---|
| 0174493 A1 | 8/1985 | European Pat. Off. | |
| 372336 | 6/1990 | European Pat. Off. | |
| 2713732 | 10/1977 | Germany | 525/238 |
| 4200247 A1 | 7/1993 | Germany | |
| 49-18941 | 2/1974 | Japan | |
| 2-199162 | 8/1990 | Japan | |
| 5-70660 | 3/1993 | Japan | |
| 6-345955 | 12/1994 | Japan | |

*Primary Examiner*—David Buttner
*Attorney, Agent, or Firm*—Jacobson, Price, Holman & Stern, PLLC

[57] ABSTRACT

Disclosed is an aromatic polycarbonate-styrene polymer resin composition comprising (A) an aromatic polycarbonate, (B) a specific rubber-modified styrene polymer and (C) a compatibility agent which is a copolymer containing an aromatic vinyl monomer and which has a non-uniform distribution with respect to the proportions of component monomers constituting the copolymer, so that the copolymer comprises copolymer molecules having different solubility parameter (SP) values, wherein the difference in SP value between the copolymer molecule having a maximum SP value and the copolymer molecule having a minimum SP value is from 0.3 to 1.0 [(cal/cm$^3$)$^{1/2}$], and wherein the copolymer has an average SP value of from 10.6 to 11.0 [(cal/cm$^3$)$^{1/2}$]. The aromatic polycarbonate-styrene polymer resin composition of the present invention has not only a high impact resistance and a high heat resistance but also a high melt flowability, so that it is useful in various industrial fields, especially, fields of parts for household electrical appliances, parts for office automation machines, and the like.

7 Claims, 7 Drawing Sheets

ΔSP=0.5
Average SP value=10.75

10.8

Izod impact strength=59
(kg·cm/cm)

10.5  11.0
SP Value

ΔSP=0.6
Average SP value=10.95

10.9

Izod impact strength=41
(kg·cm/cm)

10.6  11.2
SP Value 10.9

ΔSP=0.2
Average SP value=10.95

Izod impact strength=24
(kg·cm/cm)

10.8 11.0
SP Value

○ FR-2 (Aromatic phosphate condensate)
● FR-4 (Aromatic phosphate monomer substituted with alkyl group)

AROMATIC POLYCARBONATE-STYRENE POLYMER RESIN COMPOSITION

BACKGROUND OF THE INVENTION

1. Field Of The Invention

The present invention relates to an aromatic polycarbonate-styrene polymer resin composition. More particularly, the present invention is concerned with an aromatic polycarbonate-styrene polymer resin composition comprising an aromatic polycarbonate; a specific rubber-modified styrene polymer; and a compatibility agent which is a specific copolymer containing an aromatic vinyl monomer and which has a non-uniform distribution with respect to the proportions of component monomers constituting the copolymer, so that the copolymer comprises copolymer molecules having different solubility parameter (SP) values, wherein the difference in SP value between the copolymer molecule having a maximum SP value and the copolymer molecule having a minimum SP value is within a specific range, and wherein the copolymer has an average SP value within a specific range. The aromatic polycarbonate-styrene polymer resin composition of the present invention has not only excellent impact strength and heat resistance, but also excellent melt flowability, which is a criterion for excellent molding processability.

The composition according to the present invention may further comprise a flame retardant, especially a phosphate, thereby providing a flame retardant resin composition which has an excellent flame retardancy as well as the above-mentioned excellent properties.

2. Prior Art

Due to their high impact resistance in addition to their high heat resistance, polycarbonate resin compositions obtained by incorporating a rubber-modified styrene polymer into a polycarbonate are widely used in various fields, such as the fields of parts for automobiles, household electrical appliances and office automation machines. However, such polycarbonate resin compositions having excellent impact resistance have a defect of being poor in melt flowability, and there have conventionally been problems in that it has not been possible to achieve both high impact resistance and high melt flowability at the same time.

In recent years, in the above-mentioned fields in which polycarbonate resin compositions are used, it has been desired that a polycarbonate resin composition be used for manufacturing small-thickness molded products and that the molding cycle time be reduced. Hence, there have been increasing demands for achieving an improvement in melt flowability while maintaining high impact resistance.

As prior art for providing polycarbonate resin compositions having an improved melt flowability, a technique of adding ABS resin (acrylonitrile/butadiene/styrene copolymer resin) or MBS resin (methyl methacrylate/butadiene/styrene copolymer resin) to polycarbonates (see Examined Japanese Patent Application Publication No. 38-15225) and a technique of adding polystyrene or rubber-modified polystyrene to polycarbonates (see Examined Japanese Patent Application Publication No. 43-6295) are known. However, the technique of adding an ABS resin or an MBS resin, although it brings about a dramatic improvement in impact strength, does not provide a satisfactory improvement in melt flowability. On the other hand, the technique of adding polystyrene or a rubber-modified polystyrene improves melt flowability but largely decreases impact strength, and hence has only a limited commercial application.

WO Publication No. 80/00027 discloses a resin composition comprising a polycarbonate, a polystyrene and an MBS resin (methyl methacrylate/butadiene/styrene copolymer resin). Although the resin composition of the above-mentioned publication has a high melt flowability, it has extremely low impact strength.

Unexamined Japanese Patent Application Laid-Open Specification No. 2-228353 (corresponding to EP publication No. 379039) discloses a resin composition comprising an impact resistant styrene copolymer comprised of an ethylenically unsaturated nitrile, an olefinic elastomer and styrene, an aromatic polycarbonate and a compatibility agent comprised of a core-shell type elastomer, the compatibility agent being intended to improve the compatibility between the impact resistant styrene copolymer and the aromatic polycarbonate. However, the resin composition of the above-mentioned Laid-Open Specification has a low melt flowability and a low impact strength and, therefore, poses many practical problems.

As prior art techniques for imparting flame retardancy to a polycarbonate resin, there are known, for example, a resin composition comprising a polycarbonate, an ABS resin, an organic phosphorus compound and a tetrafluoroethylene polymer (see Unexamined Japanese Patent Application Laid-Open Specification No. 2-32154), a resin composition comprising a polycarbonate, an ABS resin and a polyphosphate (see Unexamined Japanese Patent Application Laid-Open Specification No. 2-115262, corresponding to U.S. Pat. No. 5,204,394), and a resin composition comprising 50 to 90% by weight of a polycarbonate, 3 to 25% by weight of a polyphenylene ether, an ABS resin, a styrene polymer, and optionally an organic phosphorus compound and a polytetrafluoroethylene (see German Patent Application Publication No. 4200247). However, the resin compositions described in the above-mentioned publications have not only low melt flowability and low impact resistance, but are also unsatisfactory in flame retardancy and, therefore, the commercial applicability of these resin compositions is limited.

As described above, a polycarbonate resin composition simultaneously having both high melt flowability and impact strength has not been conventionally known, so that the development of such a composition and of a composition further having flame retardancy has been strongly desired.

SUMMARY OF THE INVENTION

In these situations the present inventors have made extensive and intensive studies with a view toward solving the above-mentioned problems of conventional polycarbonate resin compositions. As a result, it has surprisingly been found that by combining (A) an aromatic polycarbonate and (B) a specific rubber-modified styrene polymer with (C) at least one compatibility agent selected from the group consisting of (a) a copolymer comprising an aromatic vinyl monomer and a comonomer copolymerizable with the aromatic vinyl monomer, and (b) a graft copolymer comprising a rubbery polymer having a glass transition temperature (Tg) of $-30°$ C. or lower and, grafted thereon, an aromatic vinyl monomer (1) and a monomer (2) copolymerizable with the aromatic vinyl monomer (1), the copolymer as the compatibility agent (C) having a non-uniform distribution with respect to proportions of component monomers constituting the copolymer, so that the copolymer comprises copolymer molecules having different solubility parameter (SP) values, wherein the difference in SP value between the copolymer molecule having a maximum SP value and the copolymer molecule having a minimum SP value is from 0.3 to 1.0 $[(cal/cm^3)^{1/2}]$, and wherein the copolymer has an average SP value of from 10.6 to 11.0 $[(cal/cm^3)^{1/2}]$, a resin composition which can satisfy requirements of both high impact strength and excellent melt flowability can be obtained. The present invention has been completed, based on this novel finding.

It is, therefore, a primary object of the present invention to provide an aromatic polycarbonate-styrene polymer resin composition which has both high impact strength and high melt flowability.

Another object of the present invention is to provide, in a preferred aspect of the present invention, the above-mentioned aromatic polycarbonate-styrene polymer resin composition which further comprises at least one functional component selected from a polyphenylene ether (which has the effect of improving heat resistance and flame retardancy), a flame retardant, and the like.

The foregoing and other objects, features and advantages of the present invention will be apparent from the following detailed description and claims taken in connection with the accompanying drawings.

DETAILED DESCRIPTION OF THE INVENTION

Figure 1:
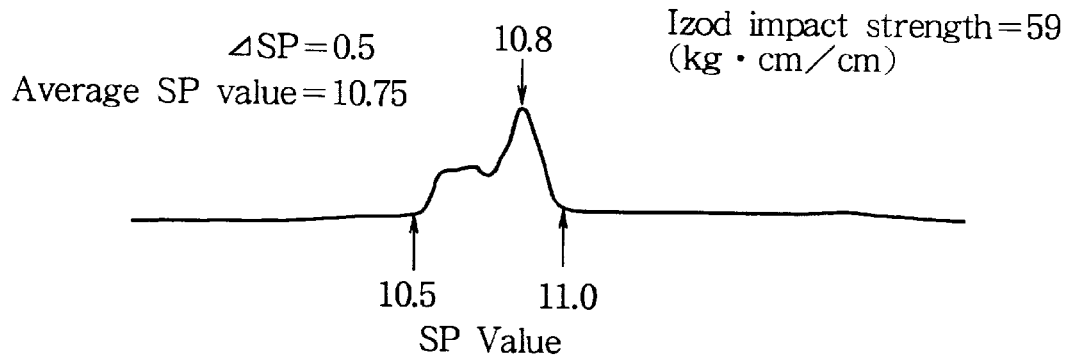
FIGS. 1 to 3 are liquid chromatograms showing the acrylonitrile content distributions in the compatibility agents [acrylonitrile-styrene copolymer (AS resin)] used in Examples 1 and 2 and Comparative Example 3, respectively, wherein each of FIGS. 1 to 3 shows the minimum SP value, the maximum SP value, the SP value of the copolymer molecule which is most abundant, the difference (ΔSP value) between the maximum and the minimum SP values, and the average SP value, together with the Izod impact strength (kg·cm/cm) of each of the resin compositions obtained in the Examples.
Figure 2:
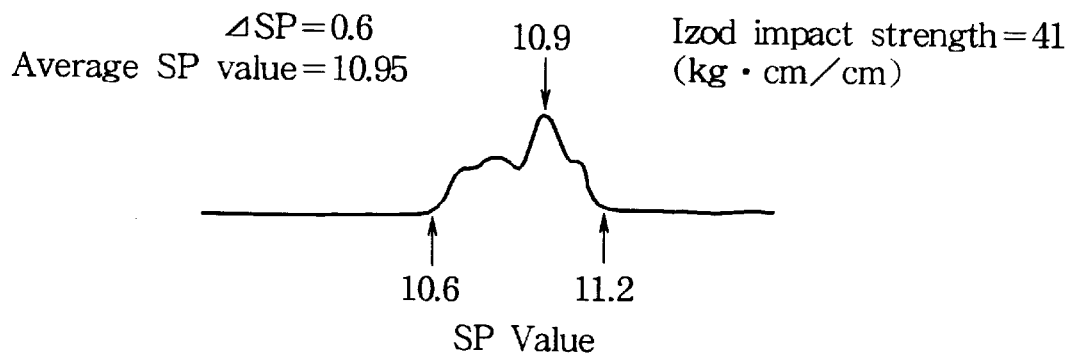
Figure 3:
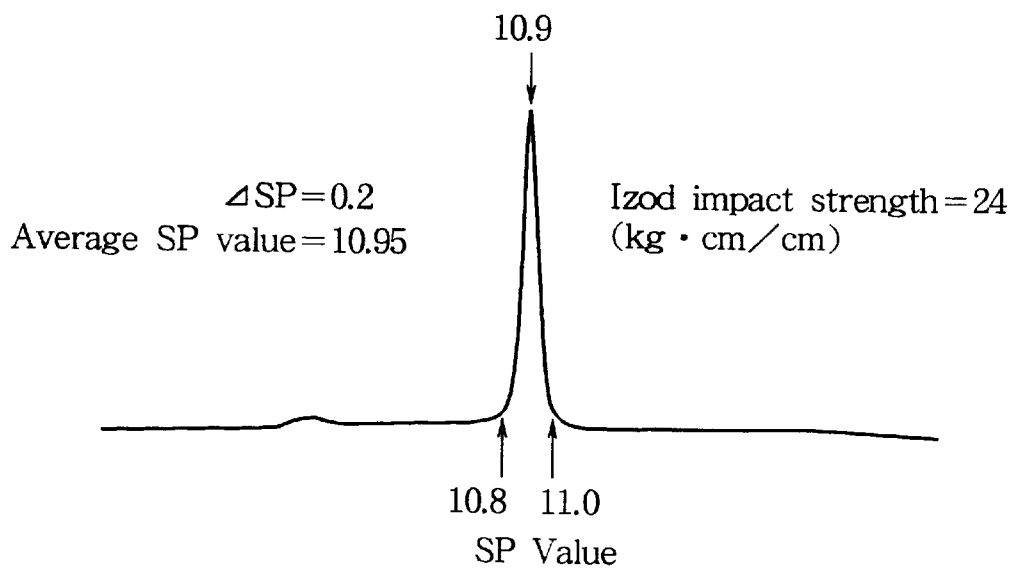
Figure 4:
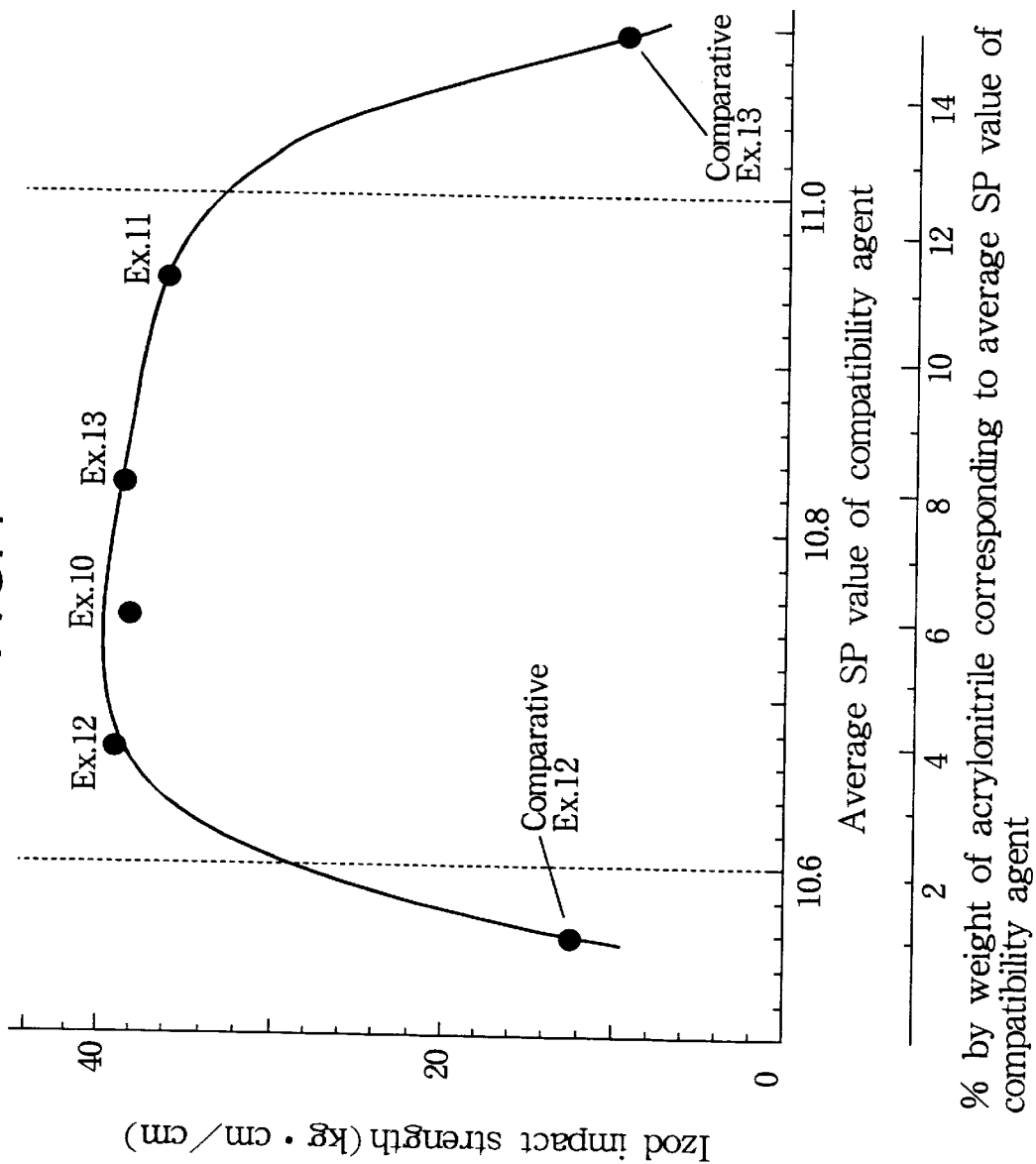
FIG. 4 shows the relationship between the average SP value of the compatibility agent and the Izod impact strength of the resin composition containing the compatibility agent, with respect to each of Examples 10 to 13 and Comparative Examples 12 and 13, wherein the values of two abscissas respectively indicate the average SP value of the compatibility agent [acrylonitrile-styrene copolymer (AS resin)] and the corresponding weight percentage of acrylonitrile, and the value of ordinate indicates the Izod impact strength (kg·cm/cm) of each of the resin compositions obtained in the Examples.

According to the present invention, there is provided an aromatic polycarbonate-styrene polymer resin composition comprising:

(A) 10 to 90 parts by weight of an aromatic polycarbonate;

(B) 5 to 85 parts by weight of a rubber-modified styrene polymer comprising a styrene polymer matrix and rubber particles dispersed therein, said styrene polymer not containing an unsaturated nitrile monomer; and (C) 0.1 to 50 parts by weight of at least one compatibility agent selected from the group consisting of:
  (a) a copolymer comprising an aromatic vinyl monomer and a comonomer copolymerizable with the aromatic vinyl monomer; and
  (b) a graft copolymer comprising a rubbery polymer having a glass transition temperature (Tg) of −30° C. or lower and, grafted thereon, an aromatic vinyl monomer (1) and a monomer (2) copolymerizable with the aromatic vinyl monomer (1), wherein each of the monomers (1) and (2) is individually in the form of a homopolymer thereof, and/or the monomers (1) and (2) are copolymerized with each other, the copolymer as the compatibility agent (C) having a non-uniform distribution with respect to the proportions of component monomers constituting the copolymer, so that the copolymer comprises copolymer molecules having different solubility parameter (SP) values, wherein the difference in SP value between the copolymer molecule having a maximum SP value and the copolymer molecule having a minimum SP value is from 0.3 to 1.0 [(cal/cm$^3$)$^{1/2}$], and wherein the copolymer has an average SP value of from 10.6 to 11.0 [(cal/cm$^3$)$^{1/2}$].

The amount of component (A) is preferably 30 to 70 parts by weight, the amount of component (B) is preferably 10 to 60 parts by weight, and the amount of component (C) is preferably 1 to 30 parts by weight.

The aromatic polycarbonate-styrene polymer resin composition according to the present invention comprises an aromatic polycarbonate (A), a rubber-modified styrene polymer resin (B), a compatibility agent (C), and, if desired, optional components selected from polyphenylene ether (D), flame retardant (E), and the like.

The above-mentioned component (A) and component (B) are the main components of the resin composition according to the present invention, and they are the components playing the role of maintaining the strength of the molded products produced from the composition. Component (B) is a component improving the impact strength and melt flowability of component (A). Component (C) is a component to render components (A) and (B) compatible with each other. Component (D) is a component to provide a heat resistance, and to provide a flame retardancy by forming a thin carbonized film on the surface of a molded product upon being burnt. Component (E) is a component to impart flame retardancy properties to components (A) and (B).

It is requisite that the above-mentioned specific compatibility agent be employed in the aromatic polycarbonate-styrene polymer resin composition of the present invention.

An example of copolymers useful as the above-mentioned compatibility agent (C) is an acrylonitrile-styrene copolymer (AS copolymer) having a specific non-uniformity in distribution with respect to proportions of component monomers constituting the copolymer (hereinafter, this distribution is frequently referred to simply as "copolymerization distribution"). The conventional AS copolymers do not have a specific non-uniformity but a uniformity in copolymerization distribution. In Unexamined Japanese Patent Application Laid-Open Specification No. 51-119789, there is a description to the effect that when the distribution in the composition of a polymer is non-uniform, not only do the mechanical characteristics and stability of a polymer become low, but also a discoloration of the polymer occurs. Thus, it is apparent that commercially available AS copolymers have a uniform copolymerization distribution, differing from component (C) used in the present invention. If commercially available AS copolymers are used for compatibilizing the aromatic polycarbonate and the rubber-modified styrene polymer with each other, it is not possible to achieve both high impact strength and excellent melt flowability simultaneously.

As afore-mentioned, there is a prior art technique achieving a certain improved degree of impact strength by combining an aromatic polycarbonate with an ABS resin. However, even if component (C), used in the present invention, e.g., an AS copolymer having a specific composition and a specific copolymerization distribution, is incorporated into such a combination of resins, the impact strength cannot be improved. Illustratively stated, a resin composition containing, as a rubber-modified styrene polymer, a styrene copolymer which contains as a comonomer an unsaturated nitrile, e.g. acrylonitrile, cannot be improved in impact strength even when component (C), used in the present invention, e.g., an AS copolymer having a specific composition and a specific copolymerization distribution is incorporated therein. The compatibility agent (C), used in the present invention is effective only in a composition system comprising component (A) (an aromatic polycarbonate), used in the present invention, and component (B) (a rubber-modified styrene polymer comprising a styrene polymer matrix and rubber particles dispersed therein, the styrene polymer not containing an unsaturated nitrile monomer), used in the present invention. Indeed, the above fact cannot be expected from conventional knowledge.

As mentioned above, in the aromatic polycarbonate-styrene polymer resin composition according to the present invention, use is made of at least one compatibility agent (C) selected from the group consisting of (a) a copolymer comprising an aromatic vinyl monomer and a comonomer copolymerizable with the aromatic vinyl monomer; and (b) a graft copolymer comprising a rubbery polymer having a glass transition temperature (Tg) of $-30°$ C. or lower and, grafted thereon, an aromatic vinyl monomer (1) and a monomer (2) copolymerizable with the aromatic vinyl monomer (1). Each of the monomers (1) and (2) is individually in the form of a homopolymer thereof, and/or the monomers (1) and (2) are copolymerized with each other.

Further, in the present invention, it is requisite that the above-mentioned specific copolymer as component (C) have a non-uniform distribution with respect to proportions of component monomers constituting the copolymer. That is, the copolymer comprises copolymer molecules having different solubility parameter (SP) values, wherein the difference in SP value (ΔSP value) between the copolymer molecule having a maximum SP value and the copolymer molecule having a minimum SP value is from 0.3 to 1.0 $[(cal/cm^3)^{1/2}]$, and wherein the copolymer has an average SP value of from 10.6 to 11.0 $[(cal/cm^3)^{1/2}]$. The average SP value is preferably 10.6 to 10.9 $[(cal/cm^3)^{1/2}]$, more preferably 10.7 to 10.8 $[(cal/cm^3)^{1/2}]$.

If the ΔSP value is outside the range of from 0.3 to 1.0 $[(cal/cm^3)^{1/2}]$, a high impact strength cannot be achieved. The ΔSP value is preferably from 0.3 to 0.8 $[(cal/cm^3)^{1/2}]$, more preferably from 0.4 to 0.6 $[(cal/cm^3)^{1/2}]$.

If the average SP value of component (C) is less than 10.6, the compatibility of component (C) with component (A) is lowered. On the other hand, if the average SP value of component (C) is more than 11.0, the compatibility of component (C) with component (B) is lowered.

The SP value of component (A) is higher than the SP value of component (B). When the SP values of components (A) and (B) differ from each other, the compatibility between components (A) and (B) is poor. In the present invention, the SP value of the compatibility agent (C) has a non-uniformity in the copolymerization distribution, so that the copolymer molecule (of the compatibility agent) having a maximum SP value is compatible with component (A), and the copolymer molecule having a minimum SP value is compatible with component (B), thereby enabling the compatibility of component (A) with component (B) to be enhanced.

The aromatic polycarbonate used as component (A) in the present invention can be selected from aromatic homopolycarbonates and aromatic copolycarbonates. Examples of methods for producing an aromatic polycarbonate include a phosgene method in which phosgene is blown into a bifunctional phenolic compound in the presence of caustic alkali and a solvent, and a transesterification method in which, for example, a bifunctional phenolic compound and diethyl carbonate are subjected to transesterification in the presence of a catalyst. A preferred range of the viscosity average molecular weight of the aromatic polycarbonate is from 10,000 to 100,000.

Examples of bifunctional phenolic compounds include 2,2'-bis(4-hydroxyphenyl)propane, 2,2'-bis(4-hydroxy-3,5-dimethylphenyl)propane, bis(4-hydroxy-phenyl)methane, 1,1'-bis(4-hydroxyphenyl)ethane, 2,2'-bis(4-hydroxyphenyl)butane, 2,2'-bis(4-hydroxy-3,5-diphenyl) butane, 2,2'-bis(4-hydroxy-3,5-dipropyl-phenyl)propane, 1,1'-bis(4-hydroxyphenyl)cyclohexane, and 1-phenyl-1,1'-bis(4-hydroxyphenyl)ethane. 2,2'-bis(4-hydroxyphenyl) propane (i.e., bisphenol A) is particularly preferred. In the present invention, bifunctional phenolic compounds can be used individually or in combination.

If desired, the rubber-modified styrene polymer used as component (B) in the present invention can have a rubber-nonmodified styrene polymer incorporated therein. In general, when the amount of the rubber in a rubber-modified styrene polymer is large, the impact strength is high, but the rigidity tends to be low. Hence, when it is desired to enhance rigidity, adding a non-rubber-modified styrene polymer to the rubber-modified styrene polymer is recommended.

As mentioned above, the rubber-modified styrene polymer (B) comprises a styrene polymer matrix and rubber particles dispersed therein, the styrene polymer not containing an unsaturated nitrile monomer. The rubber-modified styrene polymer (B) can be obtained by graft-polymerizing an aromatic vinyl monomer (styrene monomer), and optionally a vinyl monomer copolymerizable with the styrene monomer, on a rubbery polymer, using a customary method, such as a bulk polymerization method, a bulk suspension polymerization method, a solution polymerization method or an emulsion polymerization method. In this connection, it should be noted that unsaturated nitrile monomers cannot be used as the optional vinyl monomer copolymerizable with the styrene monomer.

As the rubber-modified styrene polymer (B), the so-called high impact polystyrene (hereinafter, frequently referred to as "HIPS") is particularly preferable.

With respect to the above-mentioned rubbery polymer to be used in the production of a rubber-modified styrene polymer, it is preferable that the rubbery polymer have a glass transition temperature (Tg) of −30° C. or lower. If the rubbery polymer has a glass transition temperature higher than −30° C., the improvement in the impact resistance may be unsatisfactory in some cases.

Examples of suitable rubbery polymers include diene rubbers, e.g. polybutadiene, poly(styrene-butadiene) and poly(acrylonitrile-butadiene); saturated rubbers obtained by hydrogenating the diene rubbers mentioned above; isoprene rubber; chloroprene rubber; acrylic rubbers, e.g. polybutyl acrylate; and ethylene/propylene/diene terpolymer (EPDM). Diene rubbers are particularly preferable.

Preferable examples of aromatic vinyl monomers (styrene monomers) which are graft-polymerizable with the rubbery polymer include styrene, α-methylstyrene, p-methylstyrene, p-chlorostyrene, p-bromostyrene, and 2,4,5-tribromostyrene. Styrene is most preferable, but styrene can be used in combination with other aromatic vinyl monomers mentioned above.

The content of the rubbery polymer (rubber particles) in the rubber-modified styrene polymer (B) is preferably from 5 to 80% by weight, more preferably from 10 to 50% by weight. When the content of the rubber particles is within the above-mentioned range, a good balance of the impact resistance and the rigidity can be achieved with respect to the resin composition of the present invention. The diameter of the rubber particles in the rubber-modified styrene polymer is preferably from 0.1 to 5.0 $\mu$m, more preferably from 1.0 to 2.0 $\mu$m. When the rubber particle diameter is within the above-mentioned range, the impact strength is particularly enhanced.

With respect to the rubber-modified styrene polymer (B), the reduced viscosity η sp/c (as measured in a 0.5 g/dl toluene solution at 30° C.) of the toluene soluble matters, which is a yardstick of the molecular weight, is preferably in the range of from 0.30 to 1.00 dl/g, more preferably in the range of from 0.50 to 0.80 dl/g.

With respect to producing the rubber-modified styrene polymer (B), particularly preferred is a bulk polymerization method, in which a uniform polymerization feedstock solution, comprised of a rubbery polymer, a monomer (or a monomer mixture) and a polymerization solvent, is supplied to a continuous multistage type bulk polymerization apparatus equipped with an agitator, and polymerization and devolatilization are continuously conducted. In the production of the rubber-modified styrene polymer by a bulk polymerization method, the reduced viscosity η sp/c can be controlled by selecting the polymerization temperature, the type and amount of initiator, the solvent, and the amount of the chain transfer agent. When a monomer mixture is used, the copolymerization composition can be controlled by selecting the composition of the starting monomer mixture. The rubber particle diameter can be controlled by selecting the agitation rate. Specifically, a smaller particle diameter can be obtained by using a higher agitation rate, and a larger particle diameter can be obtained by a lower agitation rate.

As mentioned above, the compatibility agent (C) is at least one copolymer containing an aromatic vinyl monomer and is selected from the group consisting of (a) a copolymer comprising an aromatic vinyl monomer and a comonomer copolymerizable with the aromatic vinyl monomer, and (b) a graft copolymer comprising a rubbery polymer having a glass transition temperature (Tg) of −30° C. or lower and, grafted thereon, an aromatic vinyl monomer (1) and a monomer (2) copolymerizable with the aromatic vinyl monomer (1). The monomer copolymerizable with the aromatic vinyl monomer is, for example, at least one member selected from the group consisting of an unsaturated nitrile monomer, an acrylic ester monomer, a methacrylic ester monomer, an acrylic acid monomer, a methacrylic acid monomer, an α,β-unsaturated carboxylic acid anhydride monomer and a maleimide monomer.

The copolymer (a) of the compatibility agent (C) mentioned above is preferably a copolymer comprised of from 98 to 50% by weight, more preferably from 97 to 75% by weight, most preferably from 97 to 88% by weight of an aromatic vinyl monomer and from 2 to 50% by weight, more preferably from 3 to 25% by weight, most preferably from 3 to 12% by weight of a comonomer copolymerizable with the aromatic vinyl monomer.

As the above-mentioned aromatic vinyl monomer, the same aromatic vinyl monomers as described in connection with component (B) can be used. Specific examples of unsaturated nitrile monomers as a monomer copolymerizable with the aromatic vinyl monomer include acrylonitrile, methacrylonitrile, and the like. Specific examples of acrylic ester monomers include those which have an alkyl group having 1–8 carbon atoms, e.g. methyl acrylate, butyl acrylate, and the like. Specific examples of methacrylic ester monomers include those having an alkyl group having 1–8 carbon atoms, e.g. methyl methacrylate, and the like. Specific examples of α,β-unsaturated carboxylic acid anhydride monomers include maleic anhydride, itaconic anhydride, and the like. Specific examples of maleimide monomers include maleimide, N-methyl maleimide, N-phenyl maleimide, and the like. Among these monomers copolymerizable with the aromatic vinyl monomer, acrylonitrile is preferred.

With respect to each of the copolymers (a) and (b) to be used as the compatibility agent (C) in the present invention, it is preferred that the solution viscosity (as measured in a 10% by weight solution of the copolymer in methyl ethyl ketone at 25° C.), which is a yardstick of the molecular weight, be in the range from 2 to 10 cP (centipoises). If the solution viscosity is less than 2 cP, the impact strength of the resin composition is low. On the other hand if the solution viscosity is larger than 10 cP, the melt flowability of the resin composition is decreased.

The copolymer (a) to be used as the compatibility agent (C) in the present invention can be produced by customary methods, such as solution polymerization, bulk polymerization, suspension polymerization, emulsion polymerization, and the like. The solution viscosity of the copolymer can be controlled by selecting the polymerization temperature, the type and amount of the initiator and the amount of the chain transfer agent. The composition of the copolymer can be controlled by selecting the composition of the starting monomer mixture. The copolymerization distribution can be controlled by selecting a reaction apparatus. Specifically, a narrower distribution can be achieved by using a complete mixing type reactor, and a broader distribution can be achieved by using a plug flow type reactor. It is also possible to control the copolymerization distribution by using a plurality of copolymers having different narrow copolymerization distributions.

The graft copolymer (b) to be used as the compatibility agent (C) in the present invention is preferably a graft copolymer comprised of 5–80% by weight of a rubbery polymer having a glass transition temperature (Tg) of −30° C. or lower and 95–20% by weight of the monomer described in connection with the above-mentioned copolymer (a). This graft copolymer comprises a resin matrix and a rubbery polymer dispersed therein as rubber particles. The diameter of the rubber particles is preferably in the range of from 0.5 to 4.0 $\mu$m, more preferably in the range of from 0.8 to 1.5 $\mu$m.

As the above-mentioned rubbery polymer, the same rubbery polymer as described in connection with component (B) can be used, however, it is requisite that the rubbery polymer in component (C) have a glass transition temperature (Tg) of −30° C. or lower. When Tg is higher than −30° C., the impact resistance of the resin composition is lowered.

The graft copolymer (b), used as the compatibility agent (C) in the present invention, can be produced by customary methods, such as solution polymerization, bulk polymerization, suspension polymerization, emulsion polymerization, and the like. However, a bulk polymerization method, which is particularly preferred, comprises supplying a uniform polymerization feedstock comprised of a rubbery polymer, a monomer mixture and a polymerization solvent into a continuous multistage type bulk polymerization apparatus equipped with an agitator, and continuously conducting a polymerization reaction while effecting a devolatilization. In the production of the graft copolymer (b) by a bulk polymerization method, the solution viscosity of the graft copolymer (b), which is a yardstick of the molecular weight, can be controlled by appropriately selecting the polymerization temperature, the type and amount of the initiator, and the amount of the chain transfer agent. The copolymerization composition can be controlled by appropriately selecting the composition of the starting monomer mixture. The copolymerization distribution can be controlled in the same manner as described in connection with the production of the copolymer (a). The rubber particle diameter can be controlled by appropriately selecting the agitation rate. Illustratively stated, a smaller particle diameter can be achieved by using a higher agitation rate, and a larger particle diameter can be achieved by using a lower agitation rate.

With respect to each of copolymer (a) and graft copolymer (b) as the compatibility agent (C), used in the present invention, the aromatic vinyl monomer and the monomer copolymerizable with the aromatic vinyl monomer may form any configuration of copolymer, e.g. a random copolymer, a block copolymer or a graft copolymer.

Polyphenylene ether (PPE), which can be optionally used as component (D) in the present invention, is a homopolymer and/or a copolymer comprising recurring units represented by the following the formula:

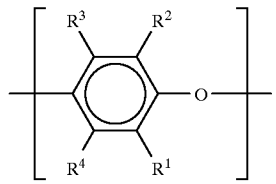

wherein each of $R^1$, $R^2$, $R^3$, $R^4$ independently represents a hydrogen atom or an unsubstituted or substituted hydrocarbon group having 1 to 10 carbon atoms.

The amount of component (D) is preferably from 1 to 30 parts by weight, more preferably from 2 to 10 parts by weight, most preferably from 3 to 7 parts by weight.

Preferred examples of polyphenylene ethers include poly (2,6-dimethyl-1,4-phenylene ether), a copolymer of 2,6-dimethyl phenol and 2,3,6-trimethyl phenol, and the like. Of them, poly(2,6-dimethyl-1,4-phenylene ether) is most preferable. The method for producing such a PPE is not particularly limited. For example, a PPE can be readily produced by the method described in U.S. Pat. No. 3,306,874, in which, for example, 2,6-xylenol is subjected to oxidative polymerization, using as a catalyst a complex of copper (I) salt and an amine.

Further, a PPE can also be readily produced by other methods described, for example, in U.S. Pat. No. 3,306,875, U.S. Pat. No. 3,257,357, U.S. Pat. No. 3,257,358, Examined Japanese Patent Application Publication No. 52-17880, Unexamined Japanese Patent Laid-Open Specification No. 50-51197. The reduced viscosity (as measured in a 0.5 g/dl chloroform solution at 30° C.) of the PPE to be used in the present invention is preferably in the range of from 0.20 to 0.70 dl/g, more preferably in the range of from 0.30 to 0.60 dl/g. As a method for achieving the above-mentioned range of reduced viscosity of the polyphenylene ether, a method in which the amount of catalyst used in the production of the polyphenylene ether is appropriately selected can be mentioned.

The flame retardant as component (E), which can be optionally used in the present invention, can be a halogen-containing flame retardant, a phosphorus flame retardant or an inorganic flame retardant. These flame retardants can be used individually or in combination. The amount of component (E) to be used is preferably 1 to 30 parts by weight, more preferably 5 to 20 parts by weight, still more preferably 8 to 15 parts by weight.

Examples of halogen-containing flame retardants include a halogenated bisphenol, a halogenated aromatic compound, a halogenated polycarbonate, a halogenated aromatic vinyl polymer, a halogenated cyanurate resin, a halogenated polyphenylene ether and the like. Of these, preferred are decabromodiphenyl oxide, tetrabromobisphenol A, tetrabromobisphenol A epoxyoligomer, a phenoxy resin containing brominated bisphenol A, a polycarbonate containing brominated bisphenol A, brominated polystyrene, brominated crosslinked polystyrene, brominated polyphenylene oxide, polydibromophenylene oxide, decabromodiphenyl oxide bisphenol condensate, a halogen-containing phosphate and the like.

As the above-mentioned phosphorus flame retardant to be used as component (E) in the present invention, an organic phosphorus compound, red phosphorus, an inorganic phosphate and the like can be mentioned.

Examples of organic phosphorus compounds include a phosphine, a phosphine oxide, a biphosphine, a phosphonium salt, a phosphinate, a phosphate, a phosphite and the like. More specifically, there can be mentioned triphenyl phosphate, methylneopentyl phosphite, pentaerythritol diethyldiphosphite, methylneopentyl phosphonate, phenylneopentyl phosphate, pentaerythritol diphenyldiphosphate, dicyclopentyl hypodiphosphate, dineopentyl hypophosphite, phenylpyrocatechol phosphite, ethylpyrocatechol phosphate, dipyrocatechol hypodiphosphate and the like.

Of the above organic phosphorus compounds, phosphates are preferred. Especially, a mixture of aromatic phosphates represented by the following formula (I) is preferred:

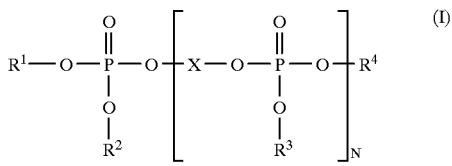

wherein each of $R^1$, $R^2$, $R^3$ and $R^4$ independently represents an unsubstituted or substituted aromatic group having 6 to 20 carbon atoms; X represents an unsubstituted or substituted arylene group having 6 to 25 carbon atoms; and N is an integer and has an average value of from 0 to 0.9, wherein the average value of N is defined by formula (II):

Average value of $N=\Sigma Nixi/\Sigma xi$ (II)

wherein Ni represents the N value of an i-th phosphate molecule of formula (I) and xi represents the weight ratio of the i-th phosphate molecule.

As specific examples of unsubstituted or substituted aromatic groups having 6 to 20 carbon atoms which are represented by $R^1$, $R^2$, $R^3$ and $R^4$ in formula (I) above, the following aromatic groups can be mentioned.

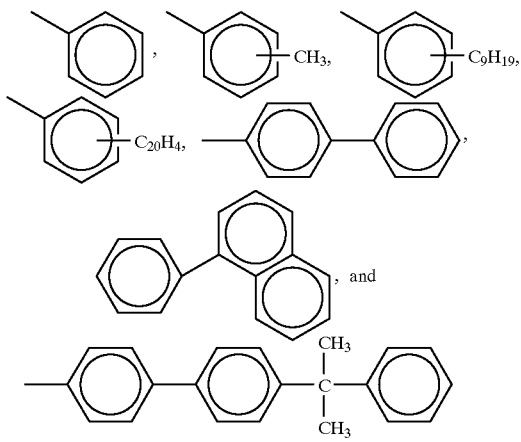

As specific examples of unsubstituted or substituted arylene groups having 6 to 25 carbon atoms which are represented by X in formula (I) above, the following arylene groups can be mentioned.

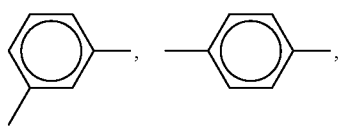

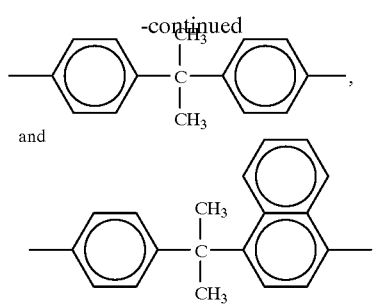

By use of a mixture of aromatic phosphates represented by formula (I) above as the flame retardant (E), not only can the impact strength be markedly increased, but also an excellent balance between impact strength and flame retardancy can be achieved.

In the present invention, the aromatic phosphate (in a mixture form) represented by formula (I) above is selected from the group consisting of an aromatic phosphate monomer and an aromatic phosphate condensate. Especially when the aromatic phosphate (in a mixture form) represented by formula (I) consists of an aromatic phosphate monomer which is substituted with an alkyl group having a specific length of molecular chain, that is, when the average value of N of formula (I) is 0, and the total number of carbon atoms of all substituent groups substituted at the aromatic rings in $R^1$, $R^2$ and $R^4$ is preferably 10 to 20, more preferably 12 to 18, a resin composition having an excellent balance between flame retardancy and resistance to volatilization can be obtained. Preferred examples of alkyl-substituted aromatic phosphate monomers include bisnonylphenyl phenyl phosphate (in which the total number of carbon atoms of all substituent groups is 18). (When the mixture of aromatic phosphates is composed of different types of aromatic phosphate monomers having different substituent groups, the total number of carbon atoms of all substituent groups substituted at the aromatic rings in $R^1$, $R^2$ and $R^4$ is expressed in terms of a number average value, wherein the number average value is defined as a sum of the products of the respective total numbers of carbon atoms of all substituent groups of the different types of aromatic phosphate monomers, individually multiplied by the respective weight ratios of the different types of aromatic phosphate monomers.) As phosphates which are preferred from the view-point of achieving a good balance between melt flowability and heat resistance of the resin compositions containing such phosphates, aromatic phosphates containing a hydroxyl group can be mentioned. As such phosphates, for example, phosphates which are obtained by introducing one or more phenolic hydroxyl groups to tricresyl phosphate, triphenyl phosphate and the like can be preferably used. Specifically, resorcinyl diphenyl phosphate, bisphenol A diphenyl phosphate and the like can be preferably used.

The red phosphorus to be used as the phosphorus flame retardant in the present invention may be an ordinary red phosphorus which has not been subjected toany treatment. However, the red phosphorus may be one which has been coated with a film of a metal hydroxide selected from the group consisting of aluminum hydroxide, magnesium hydroxide, zinc hydroxide and titanium hydroxide. Also the red phosphorus may be one which has been coated with a film composed of a mixture of a metal hydroxide (selected from the group consisting of aluminum hydroxide, magnesium hydroxide, zinc hydroxide and titanium hydroxide) and a thermosetting resin. Alternatively, the red phosphorus may be one which has been coated with a double coat constituted by an inner film composed of a metal hydroxide (selected from the group consisting of aluminum hydroxide, magnesium hydroxide, zinc hydroxide and titanium hydroxide) and an outer film composed of a thermosetting resin.

A representative example of the above-mentioned inorganic phosphate to be used as the phosphorus flame retardant is a polyammonium phosphate.

As examples of the above-mentioned inorganic flame retardant to be used as the flame retardant (E) in the present invention, there can be mentioned aluminum hydroxide, magnesium hydroxide, dolomite, hydrotalcite, calcium hydroxide, barium hydroxide, basic magnesium carbonate, zirconium hydroxide, a hydrate of an inorganic metal compound (e.g., a hydrate of tin oxide), zinc borate, zinc metaborate, barium metaborate, zinc carbonate, magnesium carbonate, calcium carbonate, barium carbonate and the like. These inorganic flame retardants can be used individually or in combination. Of the above inorganic flame retardants, at least one member selected from the group consisting of magnesium hydroxide, aluminum hydroxide, basic magnesium carbonate and hydrotalcite is especially preferred because each not only exhibits excellent flame retardancy but also is economically advantageous.

When it is desired that the aromatic polycarbonate-styrene polymer resin composition of the present invention have a more excellent flame retardancy, there can optionally be used as component (F) at least one flame retardant auxiliary which is selected from the group consisting of a triazine skeleton-containing compound, a novolak resin, a metallic substance, a silicone resin, a silicone oil, silica, an aramid fiber, a fluororesin and a polyacrylonitrile fiber. The amount of component (F) to be used in the present invention is preferably 30 parts by weight or less, more preferably 0.001 to 30 parts by weight, still more preferably 0.01 to 10 parts by weight.

The above-mentioned triazine skeleton-containing compound as component (F) acts as a flame retardant auxiliary for enhancing the flame retarding effects of a phosphorus flame retardant. Specific examples of triazine skeleton-containing compounds include melamine, melam represented by formula (III), melem represented by formula (IV), mellon (a product obtained by deammonium reaction of three molecules of melem at 600° C. or higher, generating three molecules of ammonia), melamine cyanurate represented by formula (V), melamine phosphate represented by formula (VI), succinoguanamine represented by formula (VII), adipoguanamine, methylglutaroguanamine, a melamine resin having a structure represented by formula (VIII), a BT resin having the structure represented by formula (IX) and the like. Of these, melamine cyanurate is preferred from the viewpoint of resistance to volatilization.

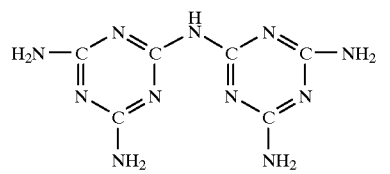

(III)

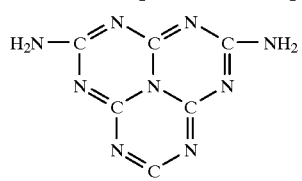

(IV)

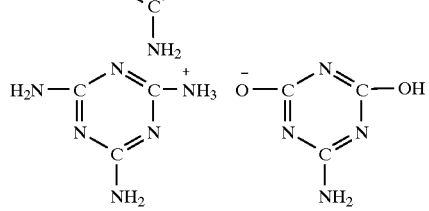

(V)

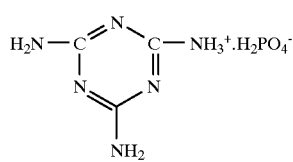

(VI)

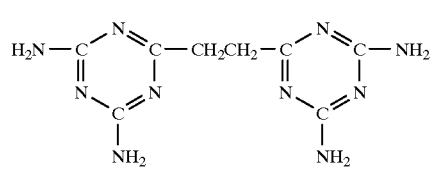

(VII)

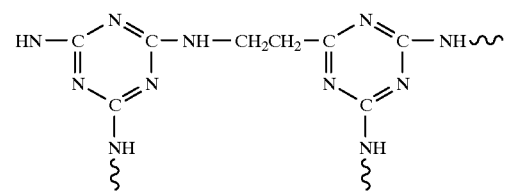

(VIII)

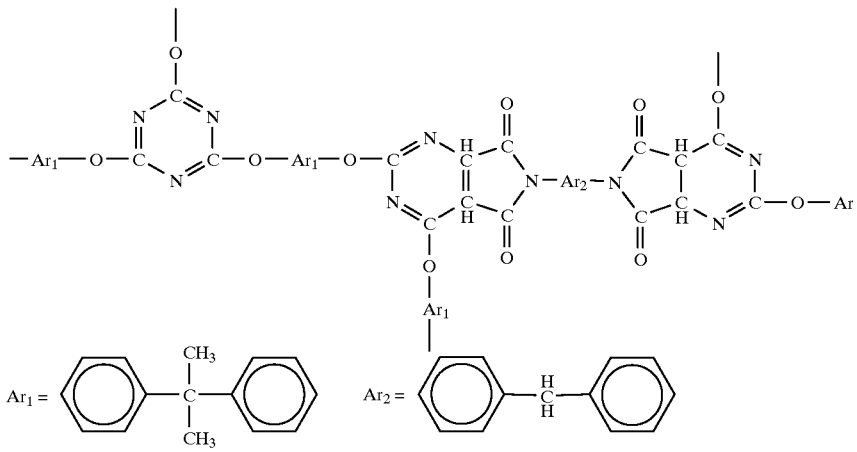

(IX)

The above-mentioned novolak resin as component (F) acts to prevent the dripping of flaming particles from a molded product upon being burnt (hereinafter, frequently referred to as "preventive properties for the dripping of flaming particles"). Further, when the novolak resin is used in combination with an aromatic phosphate containing a hydroxyl group, the melt flowability and heat resistance of the resin compositions can be improved. Novolak resin is a thermoplastic resin which can be obtained by subjecting a phenol and an aldehyde to a condensation reaction in the presence of an acid catalyst, such as sulfuric acid or hydrochloric acid. For example, the method for obtaining a novolak resin is described at pages 437 to 455 of "Kobunshi Jikkengaku 5, Jushukugo to Jufuka (Experimental Polymer Chemistry, Series 5, Condensation Polymerization and Polyaddition)" (which was published in 1980 by Kyoritsu Shuppan Co., Ltd., Japan).

A scheme (X), illustrating an example of the production of novolak resins, is shown below.

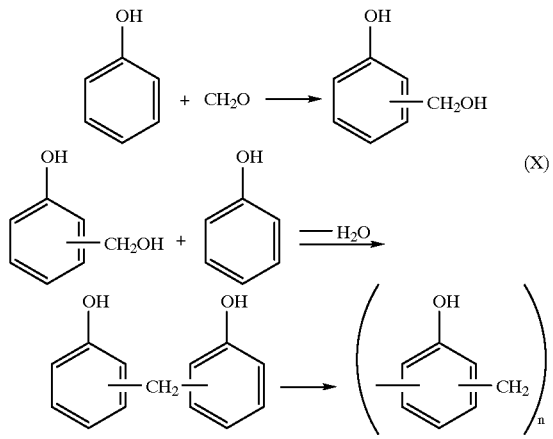

Specific examples of phenols to be used for the production of novolak resins include phenol, o-cresol, m-cresol, p-cresol, 2,5-dimethyl-, 3,5-dimethyl-, 2,3,5-trimethyl-, 3,4, 5-trimethyl-, p-t-butyl-, p-n-octyl-, p-stearyl-, p-phenyl-, p-(2-phenylethyl)-, o-isopropyl-, p-isopropyl-, m-isopropyl-, p-methoxy- and p-phenoxy-phenols, pyrocatechol, resorcinol, hydroquinone, salicylaldehyde, salicylic acid, p-hydroxybenzoic acid, methyl p-hydroxybenzoate, p-cyano- and o-cyano-phenols, p-hydroxybenzenesulfonic acid, p-hydroxybenzenesulfonamide, cyclohexyl p-hydroxybenzenesulfonate, (4-hydroxyphenyl)phenyl phosphinic acid, methyl(4-hydroxyphenyl)phenyl phosphinate, 4-hydroxyphenylphosphonic acid, ethyl(4-hydroxyphenyl)phosphonate, diphenyl(4-hydroxyphenyl) phosphonate and the like.

Specific examples of aldehydes to be used for the production of novolak resins include formaldehyde, acetaldehyde, n-propanal, n-butanal, isopropanal, isobutyl aldehyde, 3-methyl-n-butanal, benzaldehyde, p-tolylaldehyde, 2-phenylacetoaldehyde and the like.

As the above-mentioned metallic substance as component (F), a metal oxide and/or a metal powder can be used. Examples of metal oxides include aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide, tungsten oxide and the like, and complexes (alloys) thereof. Examples of metals of the metal powders include aluminum, iron, titanium, manganese, zinc, molybdenum, cobalt, bismuth, chromium, nickel, copper, tungsten, tin, antimony and the like, and complexes (alloys) thereof.

The above-mentioned silicone resin as component (F) is one which has a three-dimensional network structure which is obtained by combining the structural units $SiO_2$, $RSiO_{3/2}$, $RSiO$ and $RSiO_{1/2}$. In these structural units, each R independently represents an alkyl group having 1 to 10 carbon atoms (e.g., a methyl group, an ethyl group, a propyl group or the like), an aromatic group having 6 to 20 carbon atoms (e.g., a phenyl group, a benzyl group or the like), or a vinyl group-containing substituent group obtained by introducing a vinyl group to the above-mentioned alkyl group or the above-mentioned aromatic group. Especially, a silicone resin, in which R is the above-mentioned vinyl group-containing substituent group, obtained by introducing a vinyl group to the above-mentioned alkyl group or the above-mentioned aromatic group, is preferred.

The above-mentioned silicone resin can be obtained by hydrolyzing organohalosilanes corresponding to the above-mentioned structural units and subsequently polymerizing the hydrolyzed products.

A silicone oil as component (F) is a polydiorganosiloxane comprising a structural unit represented by the following formula (XI):

In formula (XI) above, each R independently represents an alkyl group having 1 to 8 carbon atoms, an aryl group having 6 to 13 carbon atoms, a vinyl group-containing group obtained by introducing a vinyl group to the above-mentioned alkyl group or the above-mentioned aryl group, a vinyl group-containing group represented by formula (XII) or a vinyl group represented by formula (XIII).

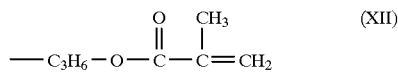

The viscosity of the silicone oil is preferably 600 to 1,000,000 centipoises (as measured at 25° C.), more preferably 90,000 to 150,000 centipoises (as measured at 25° C.).

The above-mentioned silica as component (F) is amorphous silicon dioxide. Especially, a silica coated with a hydrocarbon compound (which is obtained by treating the surface of silica with a silane type coupling agent composed of a silane and a hydrocarbon compound linked thereto) is preferred. Silica coated with a vinyl group-containing hydrocarbon compound is more preferred.

Examples of silane type coupling agents include vinyl group-containing silanes, such as p-styryltrimethoxysilane, vinyltrichlorosilane, vinyltris(β-methoxyethoxy)silane, vinyltriethoxysilane, vinyltrimethoxysilane and γ-methacryloxypropyltrimethoxysilane; epoxysilanes, such as β-(3,4-epoxycyclohexyl)ethyltrimethoxysilane, γ-glycidoxypropyltrimethoxysilane and γ-glycidoxypropyltriethoxysilane; and aminosilanes, such as N-β-(aminoethyl)-γ-aminopropyltrimethoxysilane, N-β-(aminoethyl)-γ-aminopropylmethyldimethoxysilane, γ-aminopropyltriethoxysilane and N-phenyl-γ-aminopropyltrimethoxysilane. Of these, preferred are silane type coupling agents having a structural unit which is similar to that of a thermoplastic resin employed. For example, when a styrene polymer is used as a thermoplastic resin, p-styryltrimethoxysilane is suitable.

The methods for treating silica with a silane type coupling agent can be roughly classified into a wet method and a dry method. In the wet method, silica is immersed in a solution of a silane type coupling agent in a hydrocarbon solvent, followed by drying. In the dry method, silica is charged in an apparatus capable of agitating at a high speed (e.g., Henschel mixer), and a solution of a silane type coupling agent in a hydrocarbon solvent is gradually dropped in the charged silica under agitation, followed by a heat-treatment.

With respect to the above-mentioned aramid fiber as component (F), it is preferred that the fiber have an average diameter of from 1 to 500 μm and an average fiber length of from 0.1 to 10 mm. The aramid fiber can be produced by a method in which isophthalamide or polyparaphenylene terephthalamide is dissolved in a polar solvent containing an amide, or sulfuric acid, and the resultant solution is subjected to dry spinning or wet spinning.

The above-mentioned fluororesin as component (F) acts to improve the preventive properties for the dripping of flaming particles, and is composed of a homopolymer or copolymer of a fluorine-containing monomer. Specific examples of fluororesins include polymonofluoroethylene, polydifluoroethylene, polytrifluoroethylene, polytetrafluoroethylene, a tetrafluoroethylene/hexafluoropropylene copolymer and the like. As long as the preventive properties for the dripping of flaming particles are not impaired, if desired, the above-mentioned fluorine-containing monomer may be polymerized or copolymerized with a monomer which contains no fluorine and is copolymerizable with the fluorine-containing monomer.

With respect to the method for producing a fluororesin, reference can be made to U.S. Pat. Nos. 2,393,697 and 2,534,058. For example, a powdery polytetrafluoroethylene can be obtained by a method in which tetrafluoroethylene is polymerized in an aqueous medium at a temperature of 0 to 200° C. under a pressure of 7 to 70 kg/cm² using a radical initiator (such as ammonium persulfate or potassium persulfate) and optionally an emulsifier, and then the resultant reaction mixture (in the form of a suspension, dispersion or emulsion) is treated with an inorganic salt (e.g., aluminum sulfate) or the like to thereby allow the reaction mixture to coagulate or precipitate.

For effectively preventing melt dripping of a molded product, it is preferred that the fluororesin be melt-kneaded together with a thermoplastic resin (the type and function of which are described below) at a temperature which is not less than the melting temperature of the fluororesin. For example, a polytetrafluoroethylene is preferably melt-kneaded together with such a thermoplastic resin at a temperature of 300 to 350° C. By melting the fluororesin together with the thermoplastic resin, while applying a shearing force, at a temperature which is not less than the melting temperature of the fluororesin, the fluororesin is highly fibrillated, oriented and crystallized in the thermoplastic resin. As a result, a fluororesin having a specific higher-order structure can be obtained. Illustratively stated, the obtained fluororesin is in a branched fibril form, wherein the branched fibril comprises an oriented trunk fiber and branch fibers branched from the trunk fiber. Such a fluororesin in a branched fibril form is three-dimensionally entangled with the thermoplastic resin, so that melt dripping of a molded product can be prevented. As the thermoplastic resin to be melt-kneaded together with the fluororesin, a rigid resin having a high melt viscosity (e.g., polyphenylene ether) is more preferred than a rubber-modified resin (e.g., a rubber-modified polystyrene) from the viewpoint of ease in applying a high shearing force to the fluororesin.

As a method for producing the resin composition of the present invention containing the above-mentioned fluororesin having a specific higher-order structure, for example, the following two methods can be mentioned. In the first method, a fluororesin, a thermoplastic resin (e.g., polyphenylene ether), and optionally a dispersant, and the like, are melt-kneaded together at a temperature which is not less than the melting temperature of the fluororesin, thereby obtaining a masterbatch. Subsequently, a desired amount of the melt-kneaded product is taken out of the masterbatch and further melt-kneaded together with the components of the resin composition of the present invention to be produced. In the second method, use is made of an extruder which has a first extrusion zone and a second extrusion zone having a side feed opening. A fluororesin, a thermoplastic resin (e.g., polyphenylene ether) and optionally some of the components of the resin composition of the present invention (e.g., an aromatic polycarbonate) are melt-kneaded together at a temperature which is not less than the melting temperature of the fluororesin in the first extrusion zone and then, further melt-kneaded in the second extrusion zone at a temperature which is lower than the temperature in the first extrusion zone, while feeding the remaining or all components of the resin composition of the present invention to be produced through the side feed opening.

It is preferred that the resin composition of the present invention contain (F) 0.001 to 30 parts by weight of a flame retardant auxiliary comprising a fluororesin in a branched fibril form. It is most preferred that 0.01 to 1.0 parts by weight of such a flame retardant be contained in the resin composition of the present invention. The branched fibril comprises an oriented trunk fiber having a diameter of 0.1 µm or more and at least one branch fiber branched from the trunk fiber per 1 µm of the length thereof in the direction of orientation, wherein the branch fiber also has a diameter of 0.1 µm or more.

With respect to the above-mentioned polyacrylonitrile fiber as component (F), it is preferred that the average diameter be 1 to 500 µm and the average fiber length be 0.1 to 10 mm. With respect to the method for producing a polyacrylonitrile fiber, there can be mentioned a dry spinning method in which an acrylonitrile polymer is dissolved in a solvent (such as dimethylformamide), and the resultant solution is subjected to a spinning under the flow of air at 400° C., and a wet spinning method in which an acrylonitrile polymer is dissolved in a solvent (such as nitric acid), and the resultant solution is subjected to spinning in water.

When a higher melt flowability is required, the aromatic polycarbonate-styrene polymer resin composition according to the present invention can contain, as component (G), at least one flowability improver selected from the group consisting of a copolymer of an aromatic vinyl monomer unit and an acrylic ester monomer unit, an aliphatic hydrocarbon, a higher fatty acid, a higher fatty acid ester, a higher fatty acid amide, a higher fatty alcohol and metallic soap. The amount of component (G) is preferably 30 parts by weight or less, more preferably from 0.5 to 30 parts by weight, most preferably from 1.0 to 10 parts by weight.

As the aromatic vinyl monomer unit of the copolymer mentioned above as component (G), the same aromatic vinyl monomer unit as described in connection with component (B) can be used. As the acrylic ester monomer unit of the copolymer mentioned above as component (G), those which have an alkyl group having 1 to 8 carbon atoms, e.g. methyl acrylate, butyl acrylate and the like can be mentioned.

The acrylic ester unit content of the above-mentioned copolymer as component (G) is preferably from 3 to 40% by weight, more preferably from 5 to 20% by weight. The above-mentioned copolymer preferably has a solution viscosity (as measured in a 10% by weight solution in methyl ethyl ketone at 25° C.), which is a yardstick of the molecular weight, of from 2 to 10 cP (centipoises). If the solution viscosity is less than 2 cP, the impact strength of the resin composition is lowered. On the other hand, when the solution viscosity is larger than 10 cP, the improving effect on the melt flowability is reduced.

The aliphatic hydrocarbon mentioned above as component (G) is a processing aid, and can be selected from liquid paraffin, natural paraffin, microwax, polyolefin wax, synthetic paraffin and the partial oxidation products thereof, fluorides thereof, chlorides thereof, and the like.

The higher fatty acid mentioned above as component (G) can be selected from saturated fatty acids, e.g. caproic acid, hexadecanoic acid, palmitic acid, stearic acid, phenyl stearate, ferronic acid; and unsaturated fatty acids, e.g. ricinoleic acid, lysine elaidic acid, 9-oxy-12-octadecenoic acid; and the like.

The higher fatty acid ester mentioned above as component (G) can be selected from monohydric alcohol esters of fatty acids, e.g. methyl phenylstearate, butyl phenylstearate; monohydric alcohol esters of polybasic acids, e.g. diphenylstearyl phthalate; sorbitan esters, e.g. sorbitan monolaurate, sorbitan monostearate, sorbitan monooleate, sorbitan sesquioleate, sorbitan trioleate, polyoxyethylene sorbitan monolaurate, polyoxyethylene sorbitan monopalmitate, polyoxyethylene sorbitan monostearate, polyoxyethylene sorbitan monooleate; fatty acid esters of glycerin monomer, e.g. stearic acid monoglyceride, oleic acid monoglyceride, capric acid monoglyceride, behenic acid monoglyceride; fatty acid esters of polyglycerin, e.g. polyglycerin stearic acid ester, polyglycerin oleic acid ester, polyglycerin lauric acid ester; fatty acid esters having a polyalkylene ether unit, e.g. polyoxyethylene monolaurate, polyoxyethylene monostearate, polyoxyethylene monooleate; neopentyl polyol esters of fatty acids, e.g. neopentyl polyol distearate; and the like.

The higher fatty acid amide mentioned above as component (G) can be selected from monoamides of saturated fatty acids, e.g. phenylstearamide, methylol stearamide, methylol behenylamide; N,N'-disubstituted monoamides, e.g. coconut oil fatty acid diethanolamide, lauric acid diethanolamide, oleic acid diethanolamide; saturated fatty acid bis-amides, e.g. methylene bis-(12-hydroxyphenyl)stearamide, ethylene bis stearamide, ethylene bis(12-hydroxyphenyl) stearamide, hexamethylene bis(12-hydroxyphenyl) stearamide; aromatic bisamides, e.g. m-xylene bis (12-hydroxyphenyl) stearamide; and the like.

The higher fatty alcohol mentioned-above as component (G) can be selected from monohydric alcohols, e.g. stearyl alcohol, cetyl alcohol; polyhydric alcohols, e.g. sorbitol, mannitol; polyoxyethylene dodecylamine; polyoxyethylene octadecylamine; allyl ethers having polyalkylene ether units, e.g. polyoxyethylene allyl ether; polyoxyethylene alkyl ethers, e.g. polyoxyethylene lauryl ether, polyoxyethylene dodecyl ether, polyoxyethylene cetyl ether, polyoxyethylene stearyl ether, polyoxyethylene oleyl ether; polyoxyethylene alkylphenyl ethers, e.g. polyoxyethylene octylphenyl ether, polyoxyethylene nonylphenyl ether; dihydric alcohols having polyalkylene ether units, e.g. polyepichlorohydrin ether, polyoxyethylene bisphenol A ether, polyoxyethylene ethylene glycol, polyoxypropylene bisphenol A ether, polyoxyethylene polyoxypropylene glycol ether; and the like.

The metallic soap mentioned above as component (G) can be selected from salts of the above-mentioned higher fatty acids (e.g. stearic acid) with barium, calcium, zinc, aluminum, magnesium and the like.

When a higher impact strength is required, the aromatic polycarbonate-styrene polymer resin composition according to the present invention can further comprise a thermoplastic elastomer [component (H)]. As component (H), there can be mentioned thermoplastic elastomers, such as a polystyrene elastomer, a polyolefin elastomer, a polyester elastomer, a polyurethane elastomer, a 1,2-polybutadiene elastomer, a poly(vinyl chloride) elastomer. The thermoplastic polystyrene elastomers are particularly preferable. The amount of component (H) is preferably 30 parts by weight or less, more preferably from 1 to 30 parts by weight, most preferably from 2 to 10 parts by weight.

The above-mentioned thermoplastic polystyrene elastomer is selected from a block copolymer comprised of an aromatic vinyl monomer and a conjugated diene monomer and a hydrogenated block copolymer obtained by partially hydrogenating the conjugated diene moiety of the above block copolymer.

As the aromatic vinyl monomer in the block copolymer as component (H), the same aromatic vinyl monomer as described in connection with component (B) can be used. Styrene is most preferable, but styrene can be copolymerized with other aromatic vinyl monomers mentioned above.

As the conjugated diene monomer in the block copolymer as component (H), 1,3-butadiene, isoprene, and the like can be mentioned.

With respect to the block configuration of the block copolymer mentioned above as component (H), the block copolymer is preferably a linear block copolymer having a configuration of, for example, SB, S(BS)n or S(BSB)$_m$, or a star shaped block copolymer having a conjugated diene at the linkage center and having a configuration of (SB)$_p$X, wherein S represents a polymer block comprised of aromatic vinyl monomers, B represents a polymer block comprised of conjugated diene monomers and/or a partially hydrogenated product thereof, X represents a coupling agent residue (e.g. silicon tetrachloride, tin tetrachloride, a polyepoxy compound), n represents an integer of from 1 to 3, m represents an integer of 1 or 2, p represents an integer of from 3 to 6. Among them, linear block copolymers respectively having a 2-block configuration "SB", a 3-block configuration "SBS", and a 4-block configuration "SBSB" are preferable.

When light resistance is required, the aromatic polycarbonate-styrene polymer resin composition according to the present invention can further comprise at least one light resistance improver [component (J)] selected from the group consisting of an ultraviolet light absorber, a hindered amine light stabilizer, an antioxidant, a halogen capturing agent, a sunproofing agent, a metal inactivating agent, and a light quenching agent. The amount of component (J) is preferably 10 parts by weight or less, more preferably from 0.05 to 10 parts by weight, most preferably from 0.1 to 5 parts by weight.

The ultraviolet light absorber as component (J) is a component which absorbs light energy and releases the absorbed light energy harmlessly as heat energy due to the transformation thereof into a keto form through intramolecular proton transfer (in the case of benzophenones and benzotriazoles) or due to the experience of cis-trans isomerization (in the case of cyanoacrylates). Specific examples of UV light absorbers include 2-hydroxybenzophenones, e.g. 2,4-dihydroxybenzophenone, 2-hydroxy-4-methoxybenzophenone, 2-hydroxy-4-octoxybenzophenone, and 5,5'-methylene bis(2-hydroxy-4-methoxybenzophenone); 2-(2'-hydroxyphenyl) benzotriazoles, e.g. 2-(2'-hydroxy-5'-methylphenyl) benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-dicumylphenyl) benzotriazole, and 2,2'-methylene bis(4-t-octyl-6-benzotriazolyl)phenol; benzoates, e.g. phenylsalicylate, resorcinol monobenzoate, 2,4-di-t-butylphenyl-3',5'-di-t-butyl-4'-hydroxybenzoate, and hexadecyl-3,5-di-t-butyl-4-hydroxybenzoate; substituted oxanilides, e.g. 2-ethyl-2'-ethoxyoxanilide and 2-ethoxy-4'-dodecyloxanilide; cyanoacrylates, e.g. ethyl-α-cyano-β,β-diphenylacrylate and methyl-2-cyano-3-methyl-3-(p-methoxyphenyl) acrylate.

The hindered amine light stabilizer as component (J) is a component which decomposes hydroperoxides produced by light energy into stable N—O. radicals, N—OR or N—OH, thereby providing light stability. Specific examples of hindered amine light stabilizers include 2,2,6,6-tetramethyl-4-piperidylstearate, 1,2,2,6,6-pentamethyl-4-piperidylstearate, 2,2,6,6-tetramethyl-4-piperidylbenzoate, bis(2,2,6,6-tetramethyl-4-piperidylsebacate, bis(1,2,2,6,6-pentamethyl-4-piperidyl)sebacate, tetrakis(2,2,6,6-tetramethyl-4-piperidyl)-1,2,3, 4-butane tetracarboxylate, tetrakis(1,2,2,6,6-pentamethyl-4-piperidyl)-1,2,3,4-butane tetracarboxylate, bis(1,2,2,6,6-pentamethyl-4-piperidyl)-di(tridecyl)-1,2,3,4-butane tetracarboxylate, bis(1,2,2,6,6-pentamethyl-4-piperidyl)-2-butyl-2-(3',5'-di-t-butyl-4-hydroxybenzyl) malonate, 1-(2-hydroxyethyl)-2,2,6,6-tetramethyl-4-piperidinol/diethyl succinate polycondensate, 1,6-bis(2,2,6, 6-tetramethyl-4-piperidylamino) hexane/dibromoethane polycondensate, 1,6-bis(2,2,6,6-tetramethyl-4-piperidylamino)hexane/2,4-dichloro-6-t-octylamino-s-triazine polycondensate, 1,6-bis(2,2,6,6-tetramethyl-4-piperidylamino)hexane/2,4-dichloro-6-morpholino-s-triazine polycondensate, and the like.

The antioxidant as component (J) is a component for stabilizing peroxide radicals, such as a hydroperoxide radical, which is generated at the time of heat molding or at the time of light exposure, and for decomposing a generated peroxide, such as a hydroperoxide. Examples of antioxidants include hindered phenol type antioxidants and peroxide decomposers. In preventing autoxidation, the hindered phenol type antioxidant acts as a radical chain inhibitor, and the peroxide decomposer decomposes a generated peroxide into a stable alcohol.

Specific examples of hindered phenol type antioxidants as the above-mentioned antioxidant include 2,6-di-t-butyl-4-methylphenol, styrenated phenol, n-octadecyl-3-(3,5-di-t-butyl-4-hydroxylphenyl)propionate, 2,2'-methylene bis(4-methyl-6-t-butylphenol), 2-t-butyl-6-(3-t-butyl-2-hydroxy-5-methylbenzyl)-4-methylphenylacrylate, 2-[1-(2-hydroxy-3,5-di-t-pentylphenyl)ethyl]-4,6-di-t-pentylphenylacrylate, 4,4'-butylidene bis(3-methyl-6-t-butylphenol), 4,4'-thio-bis (3-methyl-6-t-butylphenol), alkylated bisphenol, tetrakis [methylene-3-(3,5-di-t-butyl-4-hydroxy-phenyl)-proprionate]methane, 3,9-bis[2-{3-(3-t-butyl-4-hydroxy-5-methylphenyl)-propionyloxy}-1,1-dimethylethyl]-2,4,8,10-tetraoxyspiro [5·5]undecane.

Specific examples of peroxide decomposers as the above-mentioned antioxidant include organic phosphorus type peroxide decomposers, such as trisnonyl-phenylphosphite, triphenylphosphite and tris(2,4-di-t-butylphenyl)phosphite; and organic thio type peroxide decomposers, such as dilauryl-3,3'-thiodipropionate, dimyristyl-3,3'-thiodipropionate, distearyl-3,3'-thio-dipropionate, pentaerythrityltetrakis(3-laurylthiopropionate), ditridecyl-3, 3'-thiodipropionate and 2-mercaptobenzimidazole.

The halogen capturing agent as component (J) is a component to capture halogen free radicals produced during heat molding or light exposure. Specific examples of halogen capturing agents include basic metal salts, such as calcium stearate and zinc stearate;

hydrotalcite; zeolite; magnesium oxide; organic tin compounds; and organic epoxy compounds.

The hydrotalcite as the above-mentioned halogen capturing agent can be selected from the basic carboxylates of metals, such as magnesium, calcium, zinc, aluminum and bismuth, and these basic carboxylates may or may not contain water. Either natural or synthetic products can be used. As a natural hydrotalcite, one having the structure of the formula:

$Mg_6Al_2(OH)_{16}CO_3.4H_2O$ can be mentioned. Examples of synthetic hydrotalcites include:

$Mg_{0.7}Al_{0.3}(OH)_2(CO_3)_{0.15}.0.54H_2O$,
$Mg_{4.5}Al_2(OH)_{13}CO_3.3.5H_2O$, $Mg_{4.2}Al_2(OH)_{12.4}CO_3$,
$Zn_6Al_2(OH)_{16}CO_3.4H_2O$, $Ca_6Al_2(OH)_{16}CO_3.4H_2O$, and
$Mg_{14}Bi_2(OH)_{29.6}.4.2H_2O$ As the above-mentioned zeolite, a type A zeolite represented by the formula: $Na_2O.Al_2O_3.2SiO_2.XH_2O$, and a zeolite, which is substituted with at least one metal selected from the group of metals belonging to Groups II and IV of the Periodic Table, can be mentioned. Examples of substituent metals include Mg, Ca, Zn, Sr, Ba, Zr, and Sn. Of these, Ca, Zn and Ba are especially preferable.

The organic epoxy compound as the above-mentioned halogen capturing agent can be selected from epoxidized soy bean oil, tris(epoxypropyl) isocyanurate, hydroquinonediglycidyl ether, diglycidyl terephthalate, 4,4'-sulfobisphenolpolyglycidyl ether, and N-glycidylphthalimide; and alicyclic epoxy compounds, such as hydrogenated bisphenol A glycidyl ether, 3,4-epoxycyclohexyl-methyl-3,4-epoxycyclohexane carboxylate, 2-(3,4-epoxycyclohexylspiro[5,5]-3,4-epoxy)-cyclohexane-m-dioxane, bis(3,4-epoxycyclohexylmethyl) adipate, vinylcyclohexenedioxide, 4-vinylepoxycyclohexane, bis(3,4-epoxy-6-methylcyclohexylmethyl) adipate, 3,4-epoxy-6-methylcyclohexyl-3,4-epoxy-6-methylcyclohexane carboxylate, methylenebis(3,4-epoxycyclohexane), dicyclopentadiene epoxide, di(3,4-epoxycyclohexylmethyl)ether of ethyleneglycol, ethylene-bis(3,4-epoxycyclohexane carboxylate), dioctyl epoxyhexahydrophthalate, and di-2-ethylhexyl epoxyhexahydrophthalate.

The sunproofing agent as component (J) is a component to prevent light from penetrating into the interior of a polymer. Specific examples of sunproofing agents include titanium oxide having a rutile structure ($TiO_2$), zinc oxide (ZnO), chromium oxide ($Cr_2O_3$) and cerium oxide ($CeO_2$).

The metal inactivating agent as component (J) is a component to inactivate heavy metal ions in the resin by forming a chelate compound. Specific examples of metal inactivating agents include an acid amine derivative, and benzotriazole and derivatives thereof.

The light quenching agent as component (J) is a component to inactivate functional groups, such as hyperoxides and carbonyl groups, formed in the polymer by photoexcitation. The inactivation occurs due to the energy transfer from the functional groups. Organic nickel and the like are known as light quenching agents.

As a typical example of a preferable formulation for the aromatic polycarbonate-styrene polymer resin composition according to the present invention, the following formulation can be mentioned. 30 to 70 parts by weight of an aromatic polycarbonate [component (A)], 10 to 60 parts by weight of a rubber-modified styrene polymer [component (B)] (optionally containing a rubber-nonmodified styrene polymer), 1 to 30 parts by weight of a compatibility agent [component (C)], 1 to 30 parts by weight of a polyphenylene ether [component (D)], 1 to 30 parts by weight of a flame retardant [component (E)] comprised of an organic phosphorus compound, especially, a mixture of aromatic phosphates represented by formula (I), 30 parts by weight or less of a fluororesin [component (F)], 30 parts by weight or less of a higher fatty acid amide [component (G)], 30 parts by weight or less of a thermoplastic elastomer comprised of a styrene-butadiene block copolymer [component (H)], and 0.05 to 10 parts by weight of a light resistance improver comprised of a benzotriazole ultraviolet light absorber [component (J)].

When the resin composition of the present invention has the above formulation, the resin composition has an excellent balance of flame retardancy, melt flowability, impact strength and heat resistance.

Production of the aromatic polycarbonate-styrene polymer resin composition of the present invention can be effected by melt extrusion. With respect to a method for melt extrusion, all of the components can be simultaneously subjected to melt extrusion. When components other than the resin components are additionally employed, there can be mentioned an extrusion method in which the resin components [i.e. components (A) to (C) and optionally component (D)] are subjected to melt extrusion to obtain a molten mixture, and the components other than the resin components are added to the molten mixture, the resultant mixture being then subjected to melt extrusion. Alternatively, an extrusion method can be employed in which an extruder has multiple zones; the resin components are fed to a first zone of the extruder and the components other than the resin components are fed to a second zone of the extruder.

The aromatic polycarbonate-styrene polymer resin composition according to the present invention can be obtained by melt-kneading the components in a manner as mentioned above. In the production of the resin composition, additives can be added. Examples of additives include tin thermal stabilizers; lubricants, such as stearic acid and zinc stearate; fillers; reinforcement agents such as glass fibers; and colorants, such as dyes and pigments. Other types of antioxidants than mentioned above and other types of ultraviolet light absorbers than mentioned above can also be used. These additives can be used in amounts which are ordinarily used in conventional aromatic polycarbonate resin compositions.

By subjecting the resin composition of the present invention obtained as described above to, for example, injection molding or extrusion molding, a molded product having excellent impact strength and excellent heat resistance can be obtained.

In another aspect of the present invention, there is provided a compatibility agent comprising at least one member selected from the copolymer (a) and the graft copolymer (b) of component (C). The compatibility agent of the present invention is especially extremely useful to improve the compatibility between an aromatic polycarbonate and a rubber-modified styrene polymer.

BEST MODE FOR CARRYING OUT THE INVENTION

Hereinbelow, the present invention will be described in more detail with reference to the following Examples and Comparative Examples, but they should not be construed as limiting the scope of the present invention.

In the Examples and Comparative Examples, measurements were done by the following methods and apparatus.

(1) SP value (δ) (solubility parameter) and an average SP value:

(i) The SP value was calculated in accordance with the following Fedors Formula, which is described in Polymer Engineering and Science, 14, (2), 147 (1974), from the data of $\Delta e_1$ and $\Delta V_1$ of functional groups of polymers, which data are also described therein:

$$\delta = \sqrt{[\Sigma(\Delta e_1)/\Sigma(\Delta v_1)]}$$

wherein $\Delta e_1$ represents a cohesive energy per unit functional group, and $\Delta v_1$ represents a molecular volume per unit functional group, and the unit of $\delta$ is $(cal/cm^3)^{1/2}$.

(ii) The average SP value of a copolymer or a blend of copolymers was calculated from the SP values of different monomer units of the copolymer or different component copolymers of the blend by the proportional allocation of the respective SP values of the different monomer units or the different component copolymers in accordance with the respective weight ratios of the monomer units or the component copolymers, on the presumption that the additivity rule can be applied. For example, the average SP value of an acrylonitrile-styrene copolymer was calculated from the SP value of polyacrylonitrile (14.39) and the SP value of polystyrene (10.52) by the proportional allocation of the respective SP values of the polyacrylonitrile and the polystyrene in accordance with the respective weight ratios of the acrylonitrile and styrene in the copolymer.

(2) Distribution of the proportions of component monomers of a compatibility agent (maximum SP value and minimum SP value):

When the compatibility agent is, for example, an acrylonitrile-styrene copolymer, the distribution of the proportions of component monomers of the compatibility agent was analyzed by liquid chromatography, in which a nitrile group in the compatibility agent was developed using a packing material having a nitrile bond.

Illustratively stated, a sample copolymer was dissolved in tetrahydrofuran and developed at 45° C. using a liquid chromatograph, model LC-6A (manufactured and sold by Shimadzu Corporation, Japan), ZorbaxCN (manufactured and sold by DuPont, U.S.A.) as a column, and a mixed solvent of tetrahyrofuran and n-heptane as a mobile phase. The distribution of a nitrile group was determined by measuring absorption at a wavelength of 254 nm by means of a UV detector. In the obtained chromatogram, the SP value corresponding to the right end of the base line of the peak was defined as "the maximum SP value", and the SP value corresponding to the left end of the base line of the peak was defined as "the minimum SP value". For example, in the peak shown in FIG. 1, the maximum SP value is 11.0, and the minimum SP value is 10.5. The content and distribution of the nitrile group in the sample were individually determined, based on the calibration curve which had been prepared with respect to an AS resin (i.e., an acrylonitrile-styrene copolymer) having a known nitrile content.

When monomers of an acrylate, a methacrylate, an unsaturated carboxylic anhydride and the like are used instead of acrylonitrile, the distribution of the proportions of such monomers can also be measured by liquid chromatography in substantially the same manner as mentioned above.

(3) Solution viscosity of a compatibility agent:

A compatibility agent is dissolved in methyl ethyl ketone (MEK) to obtain a 10 wt % resin solution. When the compatibility agent was a graft copolymer, the resin component of the graft copolymer was extracted from the rubber component of the graft copolymer using MEK, and then a 10 wt % resin solution was prepared in substantially the same manner as mentioned above. Subsequently, 10 ml of the prepared resin solution was put in a viscometer, and the falling time $t_1$ (sec) of the resin solution was measured in a thermostatic chamber at 25° C. On the other hand, with respect to a standard solution for calibrating the viscometer (which standard solution had been prepared in accordance with JIS Z8809-1978 and had a known viscosity), the falling time $t_0$ (sec) of the standard solution was also measured in substantially the same manner as mentioned above, and the viscometer coefficient (K) was calculated according to the following formula. The solution viscosity of the compatibility agent was obtained as the product of the falling time $t_1$ (sec) of the resin solution, multiplied by the viscometer coefficient (K). The unit of the solution viscosity is centipoises (cP).

Viscometer coefficient $K=(\eta_0 d)/(t_0 d_0)$ $\eta_0$: viscosity (cP) of the standard solution at 25° C.
$t_0$: the falling time (sec) of the standard solution at 25° C.
d: density (g/cm$^3$) of the 10 wt % resin solution
$d_0$: density (g/cm$^3$) of the standard solution at 25° C.

(4) Analysis of a resin composition:

5 g of a resin composition was dissolved in 100 ml of chloroform and the obtained solution was ultracentrifuged (20,000 rpm, 1 hr) to obtain a supernatant. Then, methanol was added to the obtained supernatant in an amount twice that of the supernatant to precipitate the resin component. The resultant solution containing the precipitated resin component was ultracentrifuged to separate the resin component from the supernatant. The supernatant was analyzed by GPC (gel permeation chromatography) (HLC-8020 manufactured and sold by Tosoh Corp., Japan; mobile phase: tetrahydrofuran), and the composition of the phosphate mixture contained in the supernatant was determined from the proportions of the respective areas (which were determined from the chromatogram) for the components of the supernatant. With respect to the resin component, the proportion of the integrated values of aromatic protons or aliphatic protons was determined using a Fourier transform nuclear magnetic resonance apparatus (proton-FT-NMR), and the contents of an aromatic polycarbonate, a polyphenylene ether, a compatibility agent, and a rubber-modified styrene polymer in the resin component were determined. The resin component was dissolved in chloroform, and ethylbenzene was added to the resultant solution in an amount twice that of the solution to crystallize a resin component. The resultant solution containing the resin component was ultracentrifuged to separate the resin component from the supernatant. The supernatant was dissolved in tetrahydrofuran, and the resultant solution was subjected to filtration to obtain a filtrate. Using the filtrate, the distribution of the proportions of component monomers of the compatibility agent was determined in accordance with the method described in item (2) above entitled "Distribution of the proportions of component monomers of a compatibility agent".

(5) Weight average particle diameter of a rubber-modified styrene polymer:

The weight average particle diameter of a rubber-modified styrene polymer was determined by a method in which the respective diameters of a number of butadiene polymer particles in the resin composition are measured using a transmission electron photomicrograph according to the ultrathin sectioning method, and the weight average particle diameter of the butadiene polymer particles was calculated by the following formula:

Weight average particle diameter$=\Sigma Ni \cdot Di^4/\Sigma Ni \cdot Di^3$ (wherein Di represents the particle diameter of the measured butadiene polymer particle, and Ni represents the number of the measured butadiene polymer particles having a particle diameter of Di).

(6) Reduced viscosity η sp/c of components (B) and (D):

A mixed solvent comprising 18 ml of methyl ethyl ketone and 2 ml of methanol was added to 1 g of a rubber-modified styrene polymer. The obtained solution was shaken at 25° C. for 2 hours and centrifuged at 5° C., 18,000 rpm for 30 minutes to obtain a supernatant. The obtained supernatant was taken out, and the resin component was deposited from the supernatant with methanol, followed by drying.

0.1 g of the thus obtained resin was dissolved in toluene so that the concentration of the resin in toluene became 0.5 g/dl. 10 ml of the obtained solution was put in a Cannon-Fenske viscometer, and the falling time $T_1$ (sec) of the solution was measured at 30° C. On the other hand, the falling time $T_0$ (sec) of pure toluene was measured using the same viscometer. The reduced viscosity of the rubber-modified styrene polymer was calculated by the following formula:

$$\eta \text{ sp}/C = (T_1/T_0 - 1)/C$$

wherein C represents the concentration (g/dl) of the rubber-modified styrene polymer.

With respect to the reduced viscosity η sp/c of a polyphenylene ether, 0.1 g of the polyphenylene ether was dissolved in chloroform so that the concentration of the polyphenylene ether in chloroform became 0.5 g/dl, and the determination of the reduced viscosity was conducted in substantially the same manner as mentioned above.

(7) Izod impact strength:

The Izod impact strength of a ⅛ inch-thick, V-notched specimen was measured at 23° C. in accordance with ASTM-D256.

(8) Vicat softening temperature:

The Vicat softening temperature was measured in accordance with ASTM-D1525, and used as a criterion of heat resistance.

(9) Melt flow rate (MFR):

The melt flow rate was measured in accordance with ASTM-D1238, and used as a criterion of melt flowability. That is, the melt flow rate was determined from the extrusion rate (g/10 min) of a resin composition measured at a melting temperature of 220° C. for 10 minutes under a load of 10 kg.

(10) Flame retardancy:

The flame retardancy of a ⅛ inch-thick specimen was evaluated in accordance with the Vertical Burning Method which is described in UL-Subject 94. With respect to the method described in UL-Subject 94, reference can be made to, for example, U.S. Pat. 4,966,814.

(11) Volatility (thermogravimetric analysis):

The volatility was evaluated using a thermogravimetric analyzer DT-40 (manufactured and sold by Shimadzu Corporation, Japan) by elevating heating temperature at a rate of 10° C./min under flow of nitrogen. The temperature at which 1% weight loss occurred was used as a criterion of volatility.

(12) Light resistance:

The light resistance was evaluated using ATLAS CI35W Weatherometer (manufactured and sold by ATLAS Electric Devices Co., U.S.A.) as a light-resistance test device, in accordance with JIS K7102. Exposure conditions were as follows: a temperature of 55° C., a humidity of 55%, no rain, and exposure to a xenon light (wavelength: 340 nm, energy: 0.30 W/m$^2$) for 300 hours. The color difference ΔE between a pre-exposed molded product and a post-exposed molded product was measured, using an SM color computer model SM-3 (manufactured and sold by Suga Test Instruments Co., Ltd, Japan) in accordance with the L.a.b. method, to evaluate the color tone difference. The smaller the color tone difference, the higher the light resistance.

(13) Morphology of a fluororesin (Determination of a branched fibril form of the fluororesin in a masterbatch):

A 0.1 mm square or smaller ultrathin section was cut-out from a fluororesin sheet. The surface of the specimen was cut with a diamond knife to obtain a specimen. The obtained specimen was exposed to vapor of an aqueous 1% ruthenic acid solution in a sealed container for several hours under light shielding conditions, followed by staining with a dye.

With respect to the stained specimen, the morphology of the fluororesin was observed using a transmission electron microscope.

The components used in the Examples and Comparative Examples are shown below.

(1) Aromatic polycarbonate (PC) [component (A)]:

A commercially available bisphenol A type polycarbonate [Novarex 7025A manufactured and sold by Mitsubishi Chemical Industries, Ltd., Japan (hereinafter frequently referred to as "PC")] was used. The SP value of PC is 11.3.

(2) Rubber-modified styrene polymer (HIPS) [component (B)]:

A rubber-modified styrene polymer (HIPS) was prepared by the following method.

Polybutadiene (a weight ratio of cis-1,4 bond/trans-1,4 bond/vinyl-1,2 bond=95/2/3) (trade name: Nipol 122 OSL, manufactured and sold by Nippon Zeon Co., Ltd., Japan) was dissolved in a mixture of the other components as mentioned below to obtain a homogeneous solution.

| Polybutadiene | 11.0% by weight |
|---|---|
| Styrene | 73.7% by weight |
| Ethylbenzene | 15.0% by weight |
| α-methylstyrene dimer | 0.27% by weight |
| 1,1-bis(t-butylperoxy)-3,3,5-trimethylcyclohexane | 0.03% by weight |

The thus obtained solution was continuously fed to a series four-stage reactor having an agitator. Polymerization was conducted at 126° C., 190 rpm in the first stage; at 133° C., 50 rpm in the second stage; at 140° C., 20 rpm in the third stage; and at 155° C., 20 rpm in the fourth stage, to obtain a polymerization reaction mixture. Subsequently, the obtained polymerization reaction mixture (the solid content of which was 73%) was transferred to a devolatilizing apparatus to remove unreacted monomers and the solvent. Thus, a rubber-modified styrene polymer (hereinafter referred to as "HIPS") was obtained. The obtained rubber-modified styrene polymer was analyzed. As a result, it was found that the rubber content was 12.8% by weight, the average particle diameter of the rubber particle was 1.6 μm, and the reduced viscosity η sp/c was 0.60 dl/g. The SP value of HIPS was 10.3.

(3) Rubber-nonmodified polystyrene (general purpose polystyrene) (GPPS):

A commercially available polystyrene (weight average molecular weight : 270,000; number average molecular weight : 120,000, manufactured and sold by Asahi Chemical Industry Co., Ltd., Japan) (hereinafter frequently referred to as "GPPS") was used. The SP value of GPPS was 10.5.

(4) ABS resin (ABS):

A commercially available ABS resin [acrylonitrile/butadiene/styrene=26/14/60 (weight ratio)] (hereinafter frequently referred to as "ABS") was used.

(5) Compatibility agent [component (C)]:

(i) Copolymers AS-1 to AS-2 and AS-4 to AS-10:

A mixture of 3.4 parts by weight of acrylonitrile, 81.6 parts by weight of styrene, 15 parts by weight of ethylbenzene and, as a polymerization initiator, 0.03 parts by weight of 1,1-bis(t-butylperoxy)-3,3,5-trimethylcyclohexane was continuously fed to a series three-stage plug flow type reactor having an agitator at a rate of 0.7 liter/hr. A polymerization was conducted at 126° C., 100 rpm in the first stage; at 135° C., 20 rpm in the second stage; and at 147° C., 10 rpm in the third stage, to thereby obtain a polymerization reaction mixture. Subsequently, the obtained polymerization reaction mixture was transferred to a devolatilizing apparatus, the temperature of which was kept at 230° C., to remove unreacted monomers and the solvent. Thus, a random copolymer (hereinafter referred to as "AS-1") was obtained. The obtained copolymer was analyzed. As a result, it was found that the copolymer contained 6% by weight of the acrylonitrile monomer unit and 94% by weight of the styrene monomer unit, and had an average SP value of 10.75 (as measured by infrared absorption spectrum). Further, the distribution of the proportions of the component monomers of the copolymer was measured by liquid chromatography. As a result, it was found that the proportion of the acrylonitrile monomer units was distributed in the range of from 0 to 12% by weight in the copolymer, and the copolymer had a maximum SP value of 11.0, a minimum SP value of 10.5, and a ASP value of 0.5.

Copolymers AS-2 and AS-4 to AS-10 were produced in substantially the same manner as mentioned above, except that the weight ratio of the acrylonitrile monomer to the styrene monomer was changed as shown in Tables 1 and 3, so that the above three types of copolymers have different proportions of component monomers and different distributions with respect to proportions of the component monomers.

(ii) Copolymer AS-3:

Substantially the same procedure as in the production of copolymer AS-1 was repeated, except that a complete mixing type reactor was used as a polymerization reactor. The obtained copolymer was analyzed. As a result, it was found that the copolymer contained 11% by weight of the acrylonitrile monomer unit and 89% by weight of the styrene monomer unit (as measured by infrared absorption spectrum). Further, the distribution of the proportions of the component monomers of the copolymer was measured by liquid chromatography. As a result, it was found that the proportion of the acrylonitrile monomer units was distributed in the range of from 7 to 12% by weight in the copolymer, and the copolymer had a maximum SP value of 11.0, a minimum SP value of 10.8, and a ΔSP value of 0.2.

(iii) Copolymers MS-1, MS-2, MSB and SMA:

Copolymers MS-1, MS-2, MSB and SMA were produced in substantially the same manner as in the production of copolymer AS-1, except that each of methyl methacrylate monomer, butyl acrylate monomer and maleic anhydride monomer was individually used instead of the acrylonitrile monomer, and that the weight ratio of each of the above-mentioned monomers to styrene was individually changed as shown in Table 2.

(6) Polyphenylene ether (PPE) [component (D)]:

A stainless steel reactor was provided, which had an inlet for feeding oxygen at a bottom portion thereof and had therein a cooling coil and agitating blades. The reactor was purged with nitrogen gas, and was charged with 54.8 g of cupric bromide, 1,110 g of di-n-butylamine, and a solution which had been obtained by dissolving 8.75 kg of 2,6-xylenol in a mixed solvent composed of 20 liters of toluene, 16 liters of n-butanol and 4 liters of methanol. A polymerization reaction was conducted for 180 minutes with agitation, while continuously feeding oxygen into the reactor having an internal temperature controlled to 30° C. After completion of the reaction, crystallized polymer was collected by filtration. A mixture of methanol and hydrochloric acid was added to the collected polymer to decompose the catalyst (cupric bromide) remaining in the polymer. Further, the polymer was washed well with methanol to obtain a powdery polyphenylene ether (hereinafter frequently referred to as "PPE"). The PPE had a reduced viscosity η sp/c of 0.55 dl/g, and an SP value of 11.2.

(7) Flame retardant (phosphate) [component (E)]:

(i) Triphenyl phosphate (TPP):

A commercially available aromatic phosphate monomer (trade name: TPP, manufactured and sold by Daihachi Chemical Industry Co., Ltd., Japan) (hereinafter frequently referred to as "TPP") was used. The SP value is 10.73.

(ii) Aromatic phosphate condensate (FR-1):

A commercially available aromatic phosphate condensate (trade name: CR733S, manufactured and sold by Daihachi Chemical Industry Co., Ltd., Japan) (hereinafter frequently referred to as "FR-1") was used.

According to the analysis by GPC, it was found that FR-1 is composed of TPP dimer (n=1) and TPP oligomers (n≧2) in a weight ratio of 65/35, which are represented by formula (XIV). The SP value is 10.95.

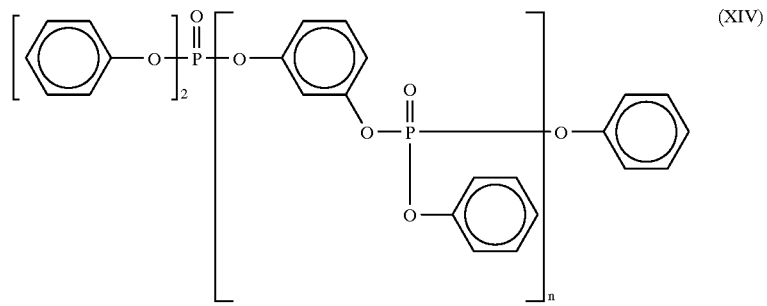

(n≧1)
n=1: TPP dimer
n≧2: TPP oligomer (iii) Aromatic phosphate condensate (FR-2):

A commercially available aromatic phosphate condensate produced from bisphenol A (trade name: CR 741, manufactured and sold by Daihachi Chemical Industry Co., Ltd., Japan) (hereinafter frequently referred to as "FR-2") was used.

According to the analysis by GPC, it was found that FR-2 is composed of TPP-A-dimer, TPP-A-oligomers and TPP in a weight ratio of 84.7/13.0/2.3, which TPP-A-dimer and TPP-A-oligomer are represented by formula (XV). The SP value is 10.80.

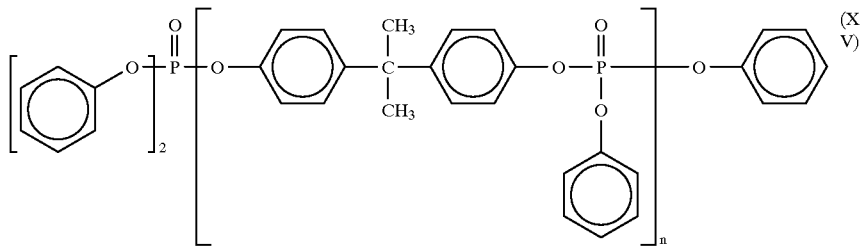

(n≧1)

n=1 : TPP-A-dimer n ≧2 : TPP-A-oligomer

In the case of the aromatic phosphate condensate represented by formula (XV) above, the average value of N of formula (I) is 1.11.

(iv) Aromatic phosphate condensate (FR-3):

A commercially available aromatic phosphate condensate produced from bisphenol A (trade name: CR 741C, manufactured and sold by Daihachi Chemical Industry Co., Ltd., Japan) (hereinafter frequently referred to as "FR-3") was used.

According to the analysis by GPC, it was found that FR-3 is composed of TCP-A-dimer, TCP-A-trimer and tricresyl phosphate (TCP) in a weight ratio of 80.4/14.1/5.5, which TCP-A-dimer and TCP-A-trimer are represented by formula (XVI). The SP value is 9.92.

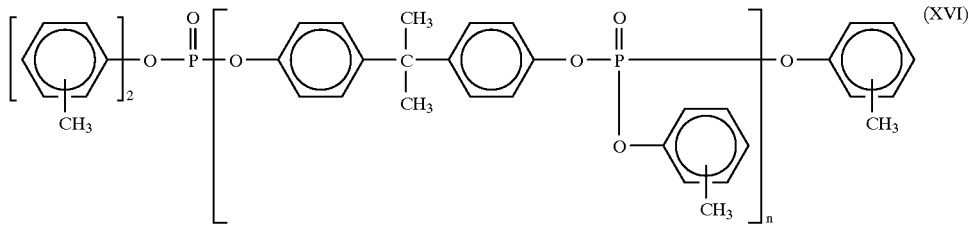

n=1 : TCP-A-dimer n=2 : TCP-A-trimer

In the case of the aromatic phosphate condensate represented by formula (XVI) above, the average value of N of formula (I) is 1.09.

(v) Production of aromatic phosphate monomer substituted with alkyl group (FR-4):

287.3 parts by weight of nonyl phenol (molar ratio: 2.0) and 0.87 part by weight of aluminum chloride (molar ratio: 0.01) were placed in a flask, and 100 parts by weight of phosphorus oxychloride (molar ratio: 1.0) were dropwise added thereto at 90° C. for 1 hour to obtain an intermediate. To the obtained intermediate was added 61.4 parts by weight of phenol (molar ratio: 1.0), and the resultant mixture was allowed to react. The reaction temperature was gradually elevated to 180° C., to thereby complete the esterification reaction. Then, the resultant reaction product was cooled and washed with water to remove the catalyst and chlorine to obtain a mixture of aromatic phosphates (hereinafter frequently referred to as "FR-4").

The obtained mixture was analyzed by GPC (gel permeation chromatography) (HLC-8020, manufactured and sold by Tosoh Corporation, Japan; mobile phase: tetrahydrofuran). As a result, it was found that the mixture of aromatic phosphates was composed of dinonylphenyl phenyl phosphate (hereinafter frequently referred to as "DNP"), trisnonylphenyl phosphate (hereinafter frequently referred to as "TNPP"), nonylphenyl diphenyl phosphate (hereinafter frequently referred to as "NDP") and nonyl phenol in a weight ratio of 77.8/11.3/8.4/2.5.

The average value of total number of carbon atoms of substituent groups was 17.9. (18×0.778+27×0.113+9×0.084=17.9)

(vi) Production of aromatic phosphate monomer substituted with alkyl group (trisnonylphenyl phosphate):

Substantially the same procedure as in the production of FR-4 was repeated, except that the molar ratio of nonyl phenol was changed to 3 and that phenol was not used.

According to the analysis by GPC, the reaction product consisted of trisnonylphenyl phosphate (hereinafter frequently referred to as "TNPP").

The average value of total number of carbon atoms of substituent groups was 27.0.

(vii) Production of aromatic phosphate monomer substituted with alkyl group (FR-5):

Substantially the same procedure as in the production of FR-4 was repeated, except that phenol (in a molar ratio of 2.0) was used instead of the nonyl phenol, and nonyl phenol (in a molar ratio of 1.0) was used instead of the phenol. The obtained mixture of aromatic phosphates was designated as "FR-5".

According to the analysis by GPC, FR-5 was composed of nonyl diphenyl phosphate (hereinafter frequently referred to as "NDP"), DNP, TPP and nonyl phenol in a weight ratio of 77.8/11.3/8.4/2.5.

The average value of total number of carbon atoms of substituent groups was 9.0. (9×0.778+18×0.113=9.0)

(8) Flame retardant auxiliary:

(i) Triazine skeleton-containing compound:

A commercially available melamine cyanurate (trade name: MC610, manufactured and sold by Nissan Chemical Industries, Ltd., Japan) (hereinafter frequently referred to as "MC") was used.

(ii) Fluororesin (PTFE)

A commercially available polytetrafluoroethylene (trade name: Teflon 6J, manufactured and sold by Du Pont-Mitsui Fluorochemicals Co., Ltd., Japan) (hereinafter frequently referred to as "PTFE") was used as a preventing agent for dripping of flaming particles.

(9) Flowability improver:

A commercially available higher fatty amide (ethylene-bis-stearamide) (trade name: Kao Wax EB FF, manufactured and sold by Kao Corporation, Japan) (hereinafter frequently referred to as "EBS") was used.

(10) Styrene-containing thermoplastic elastomer:

Styrene-butadiene block copolymer (TPE)

A commercially available styrene-butadiene block copolymer [styrene block/butadiene block=40/60 (weight ratio), trade name: Tufprene 125, manufactured and sold by Asahi Chemical Industry Co., Ltd., Japan] (hereinafter frequently referred to as "TPE") was used.

(11) Light resistance improver:

(i) Ultraviolet light absorber (UVA):

Benzotriazole-containing ultraviolet light absorber (trade name: Tinuvin P, manufactured and sold by CIBA-GEIGY, Switzerland) (hereinafter frequently referred to as "UVA") was used.

(ii) Antioxidant:

An antioxidant (trade name: Irganox 1076, manufactured and sold by CIBA-GEIGY, Switzerland) (hereinafter frequently referred to as "AO") was used.

(iii) Sunproofing agent:

Titanium oxide ($TiO_2$)

A commercially available powdery titanium oxide ($0.2\mu$, manufactured and sold by Ishihara Sangyo Kaisha, Ltd., Japan) (hereinafter frequently referred to as "$TiO_2$") was used.

In the following Examples, Comparative Examples and Tables, the following abbreviations (which are the same as described above) are used:

TPP: triphenyl phosphate

PPE: polyphenylene ether

GPPS: general purpose polystyrene

PTFE: polytetrafluoroethylene (Teflon 6J)

PC: bisphenol A type polycarbonate (Novarex 7025A)

HIPS: rubber-modified styrene polymer

EBS: ethylene-bis-stearamide (Kao Wax EB EF)

ABS: acylonitrile/butadiene/styrene resin

MC: melamine cyanurate (MC610)

TPE: styrene-butadiene block copolymer (Tufprene 125)

TNPP: trisnonylphenyl phosphate

Examples 1 to 19 and Comparative Examples 1 to 15

Resin compositions were prepared according to formulations indicated in Tables 1 to 4 by melt extrusion, using a twin-screw extruder having a side feed opening (ZSK-40 mmΦ, manufactured and sold by Werner Pfleiderer GmbH, Germany). Illustratively stated, resin components were melted at 260° C. in a first stage of the extruder. Then, into a second stage of the extruder, TPP was added to the melted resin components through the side feed opening and the resultant mixture was melt-kneaded (under conditions such that the number of screw revolutions was 295 rpm, the extrusion rate was 80 kg/h and the temperature was 240° C.) to thereby obtain pellets. (With respect to PPE, since the melting temperature of PPE is high, master pellets of PPE which had been prepared by melt-extruding GPPS/PPE at 300° C., were used.)

The obtained pellets of the individual resin compositions were individually subjected to injection molding at a cylinder temperature of 220° C. and at a mold temperature of 60° C. to obtain specimens, using an injection molding machine (Model IS80A, manufactured and sold by Toshiba Machine Co., Ltd., Japan). The molded specimens were tested to evaluate properties. Results are shown in Tables 1 to 4 and FIGS. 1 to 4.

From Tables 1 to 4 and FIGS. 1 to 4, it is apparent that, when a copolymer having specific proportions of component monomers constituting the copolymer and a specific distribution with respect to proportions of component monomers (a copolymer having specific average SP value and specific distribution of SP value) is used as a compatibility agent, the impact strength is extremely improved.

Examples 20 to 22

Substantially the same procedure as in Example 10 [in which components (A) to (E) are used] was repeated, except that 10 parts by weight of each of various mixtures of TPP and FR-3 as individually indicated in Table 5 were used instead of 10 parts by weight of TPP. Results are shown in Table 5 and FIG. 5.

Figure 5:
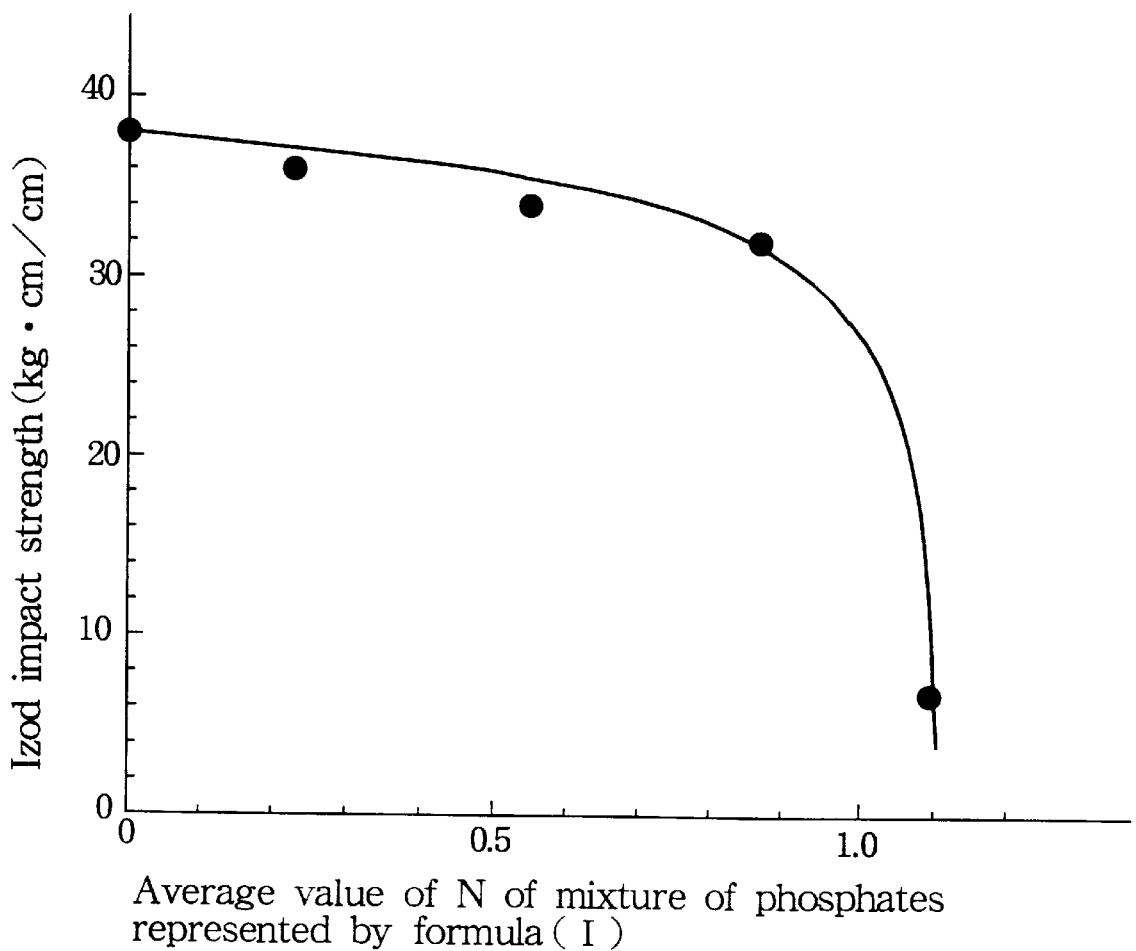
FIG. 5 shows the relationship between an average value of N of the phosphate mixture of formula (I) described below, and the Izod impact strength of the resin composition, with respect to each of the Examples shown in Table 5, with the abscissa indicating the average value of N and the ordinate indicating the Izod impact strength (kg·cm/cm)

From Table 5 and FIG. 5, it is apparent that when the average value of N of the aromatic phosphates represented by formula (I) is within the range of from 0 to 0.9, the impact strength is excellent.

Examples 23 to 28

Substantially the same procedure as in Example 10 [in which components (A) to (E) are used] was repeated, except that 10 parts by weight of one or two aromatic phosphate monomers indicated in Table 6 were used instead of 10 parts by weight of TPP. Results are shown in Table 6 and FIG. 6.

Figure 6:
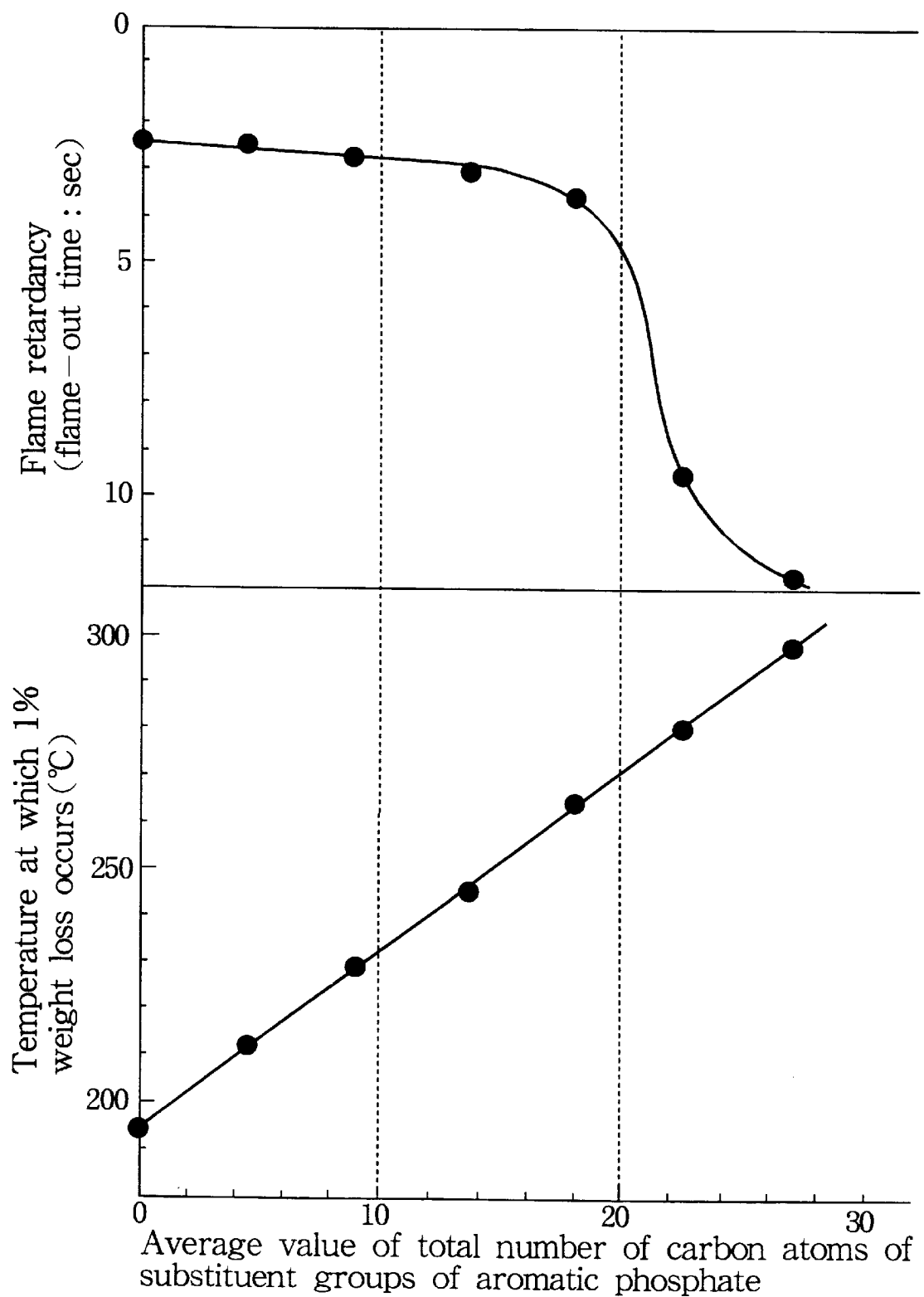
FIG. 6 shows the flame retardancy and the volatility (as measured by thermogravimetric analysis using a thermobalance) of the resin composition containing the phosphate mixture, relative to the average value of the total number of carbon atoms of the substituent groups of the phosphate mixture of formula (I) described below, wherein the average value of N of formula (I) is zero, with respect to the Examples shown in Table 6, with the abscissa value indicating the average value of the total number of carbon atoms of the substituent groups and the ordinate value indicating the flame-out time (sec) and the temperature (° C.) at which a 1% weight loss occurs for the resin compositions obtained in the Examples.

From Table 6 and FIG. 6, it is apparent that when the average value of N of the aromatic phosphates represented by formula (I) is 0, and the average value of the total number of carbon atoms of all substituent groups is within the range of from 10 to 20, a balance between the flame retardancy and the resistance to volatilization is excellent.

Examples 29 to 34

Substantially the same procedure as in Example 10 [in which components (A) to (E) are used] was repeated, except that the types and/or amounts of components (A) to (E) were changed to those which are indicated in Table 7 [in which the proportion of components (A) to (D) was changed as indicated in Table 7, and an alkyl-substituted aromatic phosphate monomer (FR-4) or an aromatic phosphate condensate (FR-2) was used instead of TPP and in an amount also shown in Table 7 per 100 parts by weight of the total amount of resin components (A) to (D)]. Results are shown in Table 7 and FIG. 7.

Figure 7:
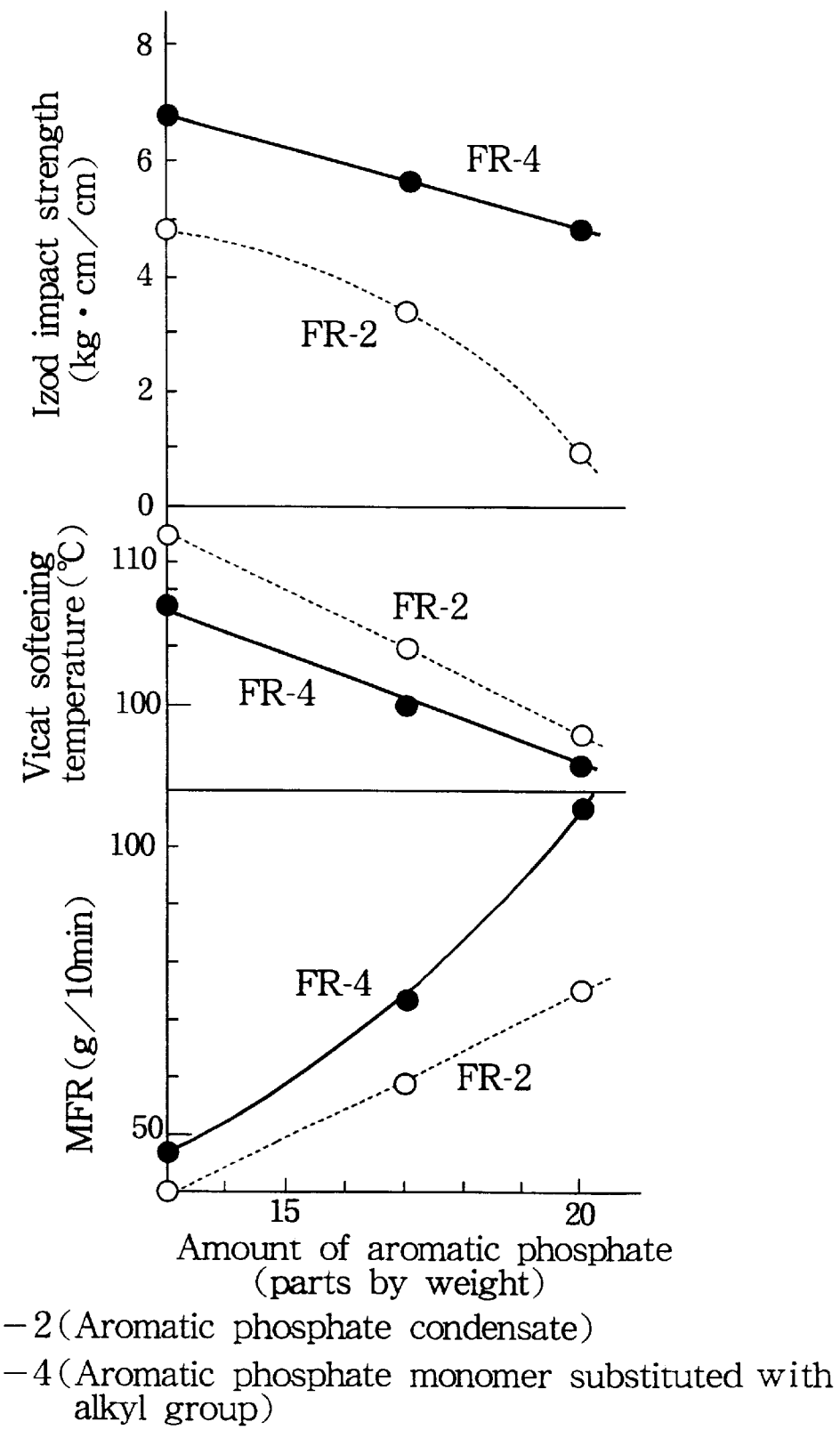
FIG. 7 shows the effects obtained by individually adding each of an alkyl-substituted aromatic phosphate monomer (FR-4) and an aromatic phosphate condensate (FR-2) to the resin components (A) to (D) [the sum of amounts of (A) to (D) are 100 parts by weight], with respect to the Examples shown in Table 7, with the abscissa value indicating the amount of aromatic phosphate added (parts by weight), and the ordinate value indicating the values of MFR (g/10 min.), Vicat softening temperature (° C.) and Izod impact strength (kg·cm/cm) of the resin compositions obtained in the Examples.

From Table 7 and FIG. 7, it is apparent that when the alkyl-substituted aromatic phosphate monomer is used, lowering of impact strength is small as compared to the case in which the aromatic phosphate condensate is used, and a balance between the melt flowability, the heat resistance and the impact strength is excellent.

Examples 35 to 37

A molded product (specimen) was produced in substantially the same manner as in Example 10 [in which components (A) to (E) are used], except that a light resistance improver shown in Table 8 was added to the resin composition. The specimen was tested to evaluate light resistance. The specimen obtained in Example 10 was also tested to evaluate light resistance. Results are shown in Table 8.

Examples 38 to 41

Substantially the same procedure as in Example 10 [in which components (A) to (E) are used] was repeated, except that a PTFE master batch (which was prepared according to the proportion of components shown in Table 9 under conditions also shown in Table 9) was used, and that the proportion of resin components was changed to PC/HIPS/GPPS/AS-1/PPE/TPP/PTFE/EBS=50/31/1.2/5/2.8/10/0.04/0.04 (weight ratio). Results are shown in Table 9.

Figure 8:
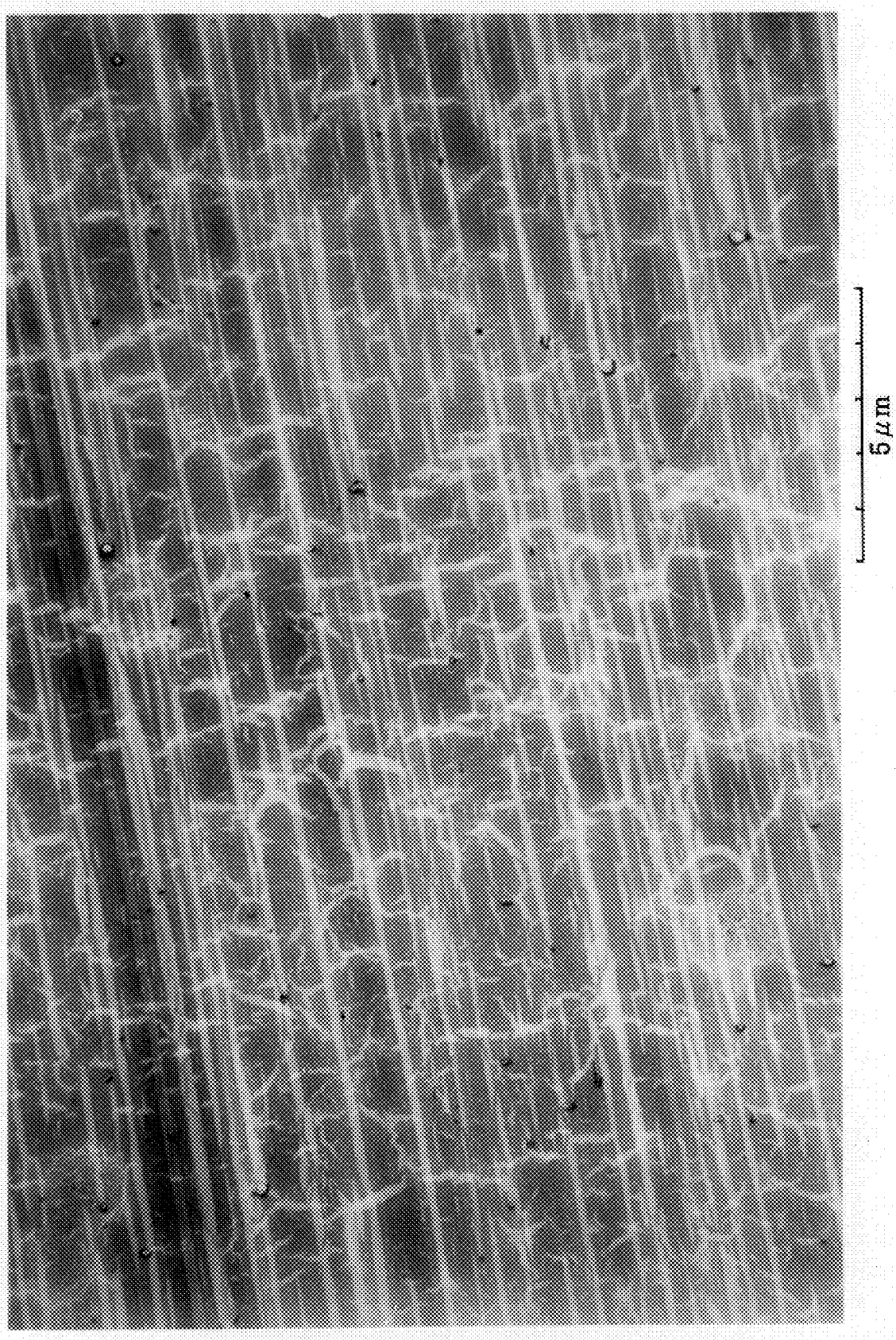
FIG. 8 is a transmission electron photomicrograph of the PTFE masterbatch F-MB-1 (melt-kneaded at 330° C.) used in Example 38, in which photomicrograph the white thick fibrous portion indicates polytetrafluoroethylene, clearly showing that it has a structure comprised of an oriented trunk fiber and a number of branch fibers branched from the trunk fiber.
Figure 9:
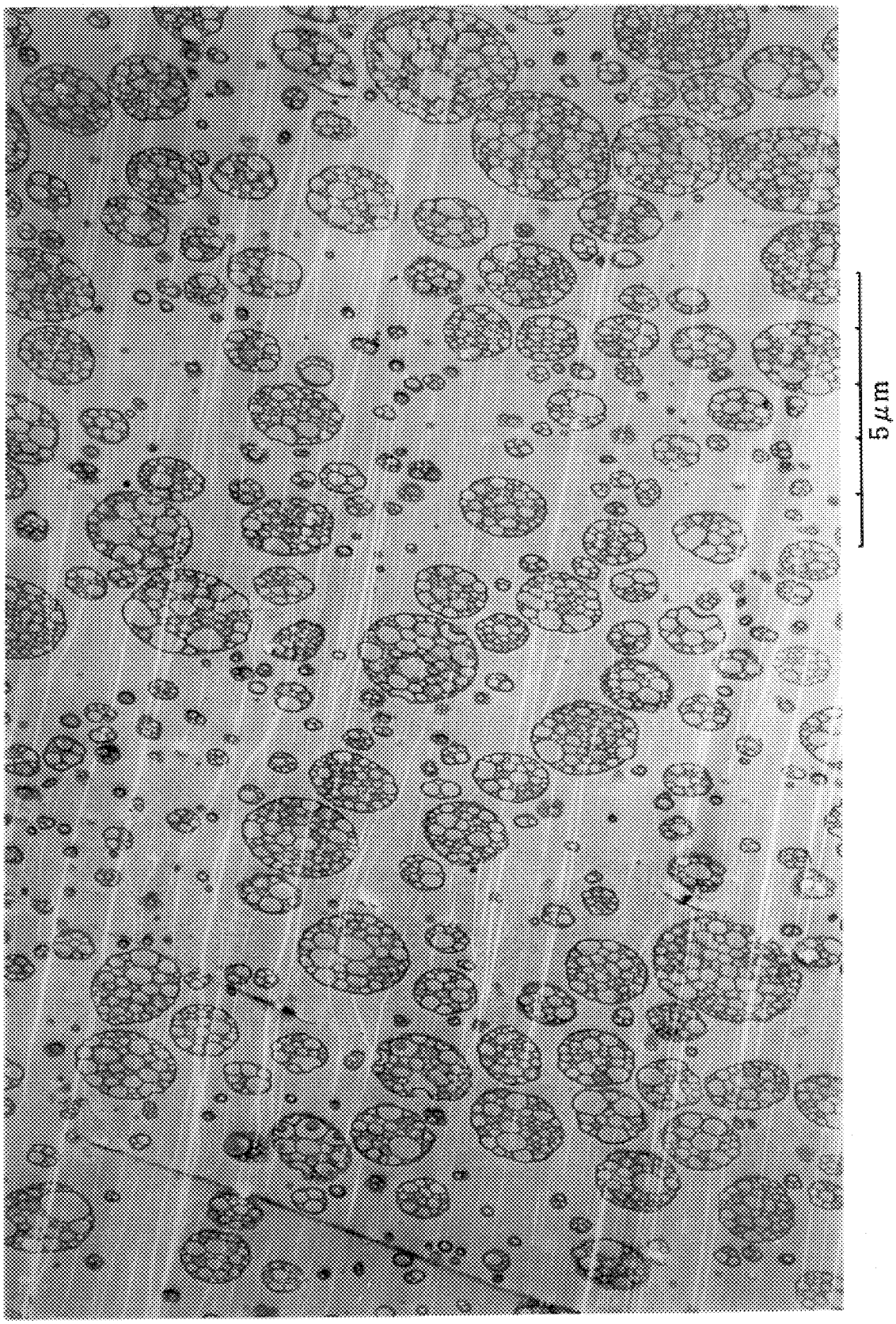
FIG. 9 is a transmission electron photomicrograph of the PTFE masterbatch F-MB-3 (melt-kneaded at 230° C.) used in the Example 40, in which photomicrograph the white fibrous portion indicates polytetrafluoroethylene, clearly showing a fiber structure such that not only is the degree of fiber formation small, but also no branch fibers are branched from an oriented trunk fiber.

The electron photomicrographs of the PTFE master batches prepared in Examples 38 and 40 are, respectively, shown in FIGS. 8 and 9. From FIGS. 8 and 9, it is apparent that the PTFE in the master batch prepared in Example 38 (which was prepared by melt-kneading the PTFE with PPE having a high viscosity at 330° C. under a high shearing force exerted due to the presence of the PPE) had a branched fibril form, in which the branched fibril comprises an oriented trunk fiber and a great number of branch fibers branched from the trunk fiber. Due to that structure, the flame retardancy of the resin composition obtained in Example 38 is superior to that of the resin composition obtained in Example 40.

TABLE 1

|  | Comp. Ex. 1 | Comp. Ex. 2 | Ex. 1 | Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|
| Resin composition |  |  |  |  |  |  |  |  |  |  |
| (A) PC (parts by weight) |  |  |  |  | 50 |  |  |  |  |  |
| (B) HIPS (parts by weight) | 50 | 40 |  |  | 45 |  |  |  | 0 |  |
| GPPS (parts by weight) | 0 | 0 |  |  | 0 |  |  |  | 0 |  |
| ABS (parts by weight) | 0 | 0 |  |  | 0 |  |  |  | 45 |  |
| Amount of component (C) (parts by weight) | 0 | 10 | 5 | 5 | 5 | 5 | 5 | 5 | 5 | 5 |
| Designation |  | GPPS | AS-1 | AS-2 | AS-3 | AS-4 | AS-5 | AS-6 | AS-3 | AS-1 |
| Monomers* |  | ST | AN/ST | AN/ST | AN/ST | AN/ST | AN/ST | AN/ST | AN/ST | AN/ST |
| Weight ratio of monomers |  | 100 | 6/94 | 11/89 | 11/89 | 11/89 | 20/80 | 25/75 | 11/89 | 6/94 |
| Average SP value |  | 10.5 | 10.75 | 10.95 | 10.95 | 10.95 | 11.29 | 11.49 | 10.95 | 10.75 |
| Maximum SP value |  | 10.5 | 11.0 | 11.2 | 11.0 | 11.6 | 11.5 | 11.7 | 11.0 | 11.0 |
| Minimum SP value |  | 10.5 | 10.5 | 10.6 | 10.8 | 10.5 | 11.1 | 11.3 | 10.8 | 10.5 |
| ΔSP value |  | 0 | 0.5 | 0.6 | 0.2 | 1.1 | 0.4 | 0.4 | 0.2 | 0.5 |
| Properties |  |  |  |  |  |  |  |  |  |  |
| Izod impact strength (kg · cm/cm) | 20 | 11 | 59 | 41 | 24 | 14 | 16 | 12 | 55 | 53 |
| MFR (g/10 min) | 12 | 20 | 14 | 13 | 13 | 12 | 12 | 12 | 5 | 7 |
| Vicat softening temperature (° C.) | 142 | 135 | 141 | 142 | 141 | 143 | 144 | 144 | 142 | 143 |

Note:
*AN: Acrylonitrile
ST: Styrene

TABLE 2

|  | Ex. 3 | Ex. 4 | Ex. 5 | Ex. 6 | Ex. 7 | Ex. 8 | Ex. 9 | Comp. Ex. 9 |
|---|---|---|---|---|---|---|---|---|
| Resin composition |  |  |  |  |  |  |  |  |
| (A) PC (parts by weight) |  |  |  |  | 50 |  |  |  |
| (B) HIPS (parts by weight) | 45 | 40 |  | 40 |  | 40 |  | 30 |
| GPPS (parts by weight) | 0 | 0 |  | 0 |  |  |  | 4 |
| Amount of component (C) (parts by weight) | 5 | 10 | 0 | 10 | 10 | 10 | 5 | 5 |
| Designation | MS-1 | MS-1 | MS-2 | AS-1 | MSB | SMA | AS-2 | AS-3 |
| Monomers* | MM/ST | MM/ST | MM/ST | AN/ST | MM/ST/B | ST/MAH | AN/ST | AN/ST |
| Weight ratio of monomers | 30/70 | 30/70 | 50/50 | 6/94 | 35/50/15 | 92/8 | 11/89 | 11/89 |
| Average SP value | 10.34 | 10.34 | 10.23 | 10.75 | 10.20 | 11.11 | 10.95 | 10.95 |
| Maximum SP value | 10.5 | 10.5 | 10.5 | 11.0 | 10.5 | 11.3 | 11.1 | 11.0 |
| Minimum SP value | 10.0 | 10.0 | 10.1 | 10.5 | 10.0 | 10.8 | 10.5 | 10.8 |
| ΔSP value | 0.3 | 0.3 | 0.4 | 0.5 | 0.5 | 0.5 | 0.6 | 0.2 |
| (D) PPE (parts by weight) |  |  |  | 0 |  |  | 11 |  |
| Properties |  |  |  |  |  |  |  |  |
| Izod impact strength | 55 | 43 | 31 | 49 | 48 | 44 | 31 | 17 |

TABLE 2-continued

|  | Ex. 3 | Ex. 4 | Ex. 5 | Ex. 6 | Ex. 7 | Ex. 8 | Ex. 9 | Comp. Ex. 9 |
|---|---|---|---|---|---|---|---|---|
| (kg · cm/cm) |  |  |  |  |  |  |  |  |
| MFR (g/10 min) | 14 | 18 | 15 | 14 | 20 | 12 | 4 | 4 |
| Vicat softening temperature (° C.) | 140 | 141 | 141 | 141 | 135 | 141 | 147 | 146 |

Note:
*AN: Acrylonitrile
B: Butyl acrylate
ST: Styrene
MAH: Maleic anhydride
MM: Methyl methacrylate

TABLE 3

|  | Ex. 10 | Ex. 11 | Comp. Ex. 10 | Comp. Ex. 11 | Comp. Ex. 12 | Ex. 12 | Ex. 13 | Comp. Ex. 13 | Ex. 14 | Ex. 15 | Ex. 16 | Comp. Ex. 14 | Comp. Ex. 15 |
|---|---|---|---|---|---|---|---|---|---|---|---|---|---|
| Resin composition |  |  |  |  |  |  |  |  |  |  |  |  |  |
| (A) PC (parts by weight) |  |  |  |  |  | 50 |  |  |  |  |  |  |  |
| (B) HIPS (parts by weight) |  |  |  |  |  | 27 |  |  |  |  |  | 0 |  |
| GPPS (parts by weight) |  |  |  |  |  | 2.4 |  |  |  |  |  | 0 |  |
| ABS (parts by weight) |  |  |  |  |  | 0 |  |  |  |  |  | 29.4 |  |
| Amount of component (C) (parts by weight) | 5 | 5 | 5 | 5 | 5 | 5 | 5 | 5 |  | 5 |  | 5 | 5 |
| Designation | AS-1 | AS-2 | AS-3 | AS-4 | AS-7 | AS-8 | AS-9 | AS-10 |  | AS-1 |  | AS-2 | AS-3 |
| AN/ST weight ratio* | 6/94 | 11/89 | 11/89 | 11/89 | 1/99 | 4/96 | 8/92 | 15/85 |  | 6/94 |  | 11/89 | 11/89 |
| Average SP value | 10.75 | 10.95 | 10.95 | 10.95 | 10.56 | 10.67 | 10.83 | 11.10 |  | 10.75 |  | 10.95 | 10.95 |
| Maximum SP value | 11.0 | 11.1 | 11.0 | 11.6 | 10.9 | 11.0 | 11.1 | 12.0 |  | 11.0 |  | 11.1 | 11.0 |
| Minimum SP value | 10.5 | 10.5 | 10.8 | 10.5 | 10.5 | 10.5 | 10.5 | 11.3 |  | 10.5 |  | 10.5 | 10.8 |
| ΔSP value | 0.5 | 0.6 | 0.2 | 1.1 | 0.4 | 0.5 | 0.6 | 0.7 |  | 0.5 |  | 0.6 | 0.2 |
| (D) PPE (parts by weight) |  |  |  |  |  |  | 5.6 |  |  |  |  |  |  |
| Amount of component (E) (parts by weight) |  |  |  | 10 |  |  |  |  | 10 | 10 | 10 | 10 | 10 |
| Designation |  |  |  | TPP |  |  |  |  | FR1 | FR2 | FR3 | TPP | TPP |
| Properties |  |  |  |  |  |  |  |  |  |  |  |  |  |
| Izod impact strength (kg · cm/cm) | 38 | 36 | 8.6 | 18 | 12 | 39 | 38 | 8.6 | 17 | 21 | 7 | 11 | 12 |
| MFR (g/10 min) | 34 | 31 | 40 | 38 | 36 | 35 | 38 | 41 | 23 | 23 | 28 | 19 | 20 |
| Vicat softening temperature (° C.) | 101 | 101 | 101 | 100 | 100 | 100 | 101 | 101 | 107 | 110 | 109 | 102 | 102 |
| Flame retardancy (UL-94) | V-0 | V-0 | V-0 | V-0 | V-0 | V-0 | V-0 | V-0 | V-0 | V-0 | V-0 | V-1 | V-1 |

Note:
*AN: Acrylonitrile
ST: Styrene

TABLE

|  | Example 17 | Example 18 | Example 19 |
|---|---|---|---|
| Resin composition |  |  |  |
| (A) PC (parts by weight) | 60 |  | 50 |
| (B) HIPS (parts by weight) | 26 | 26 | 27 |
| GPPS (parts by weight) | 0 | 1.2 | 2.4 |
| (C) AS-1 (parts by weight) | 3 | 5 | 5 |
| (D) PPE (parts by weight) | 0 | 2.8 | 5.6 |
| (E) TPP (parts by weight) | 5 | 5 | 10 |
| FR-2 (parts by weight) | 6 | 6 | 0 |
| (F) MC (parts by weight) | 0 | 4 | 0 |
| PTFE (parts by weight) | 0.3 | 0 | 0 |
| (H) TPE (parts by weight) | 0 | 0 | 5 |
| Properties |  |  |  |
| Izod impact strength (kg · cm/cm) | 40 | 32 | 34 |
| MFR (g/10 min) | 34 | 30 | 34 |
| Vicat softening temperature (° C.) | 105 | 103 | 100 |

TABLE-continued

|  | Example 17 | Example 18 | Example 19 |
|---|---|---|---|
| Flame retardancy (UL-94) | V-0 | V-0 | V-0 |

TABLE 5

|  | Ex. 10[*1] | Ex. 20 | Ex. 21 | Ex. 22 | Ex. 16[*1] |
|---|---|---|---|---|---|
| Component (E) | | | | | |
| Average value of N of formula (I) | 0 | 0.22 | 0.55 | 0.87 | 1.09 |
| Amount of phosphate (parts by weight) | | | | | |
| TPP[*2] | 10 | 8 | 5 | 2 | 0 |
| FR-3 | 0 | 2 | 5 | 8 | 10 |
| Properties | | | | | |
| Izod impact strength (kg · cm/cm) | 38 | 36 | 34 | 33 | 7 |

TABLE 5-continued

|  | Ex. 10[*1] | Ex. 20 | Ex. 21 | Ex. 22 | Ex. 16[*1] |
|---|---|---|---|---|---|
| MFR (g/10 min) | 34 | 33 | 31 | 30 | 28 |
| Flame retardancy (UL-94) | V-0 | V-0 | V-0 | V-0 | V-0 |

Note:
[*1]Data of Examples 10 and 16 in Table 3 is shown again for easy reference
[*2]Average value of N of formula (I) for TPP = 0
Average value of N of formula (I) for FR-3 = 1.09

TABLE 6

|  | Component (E) (aromatic phosphate) | | Evaluation of molded product | | |
|---|---|---|---|---|---|
|  | Average value of total number of carbon atoms of substituent groups | Designation | Flame retardancy | | Temperature at which 1% weight loss occurs (° C.) |
|  |  |  | Average flame-out time (sec) | Evaluation according to UL-94 |  |
| Example 10 | 0 | TPP | 2.4 | V-0 | 194 |
| Example 23 | 4.5 | TPP/FR-5 (weight ratio = 1/1) | 2.5 | V-0 | 212 |
| Example 24 | 9.0 | FR-5 | 2.7 | V-0 | 229 |
| Example 25 | 13.5 | FR-5/FR-4 (weight ratio = 1/1) | 3.0 | V-0 | 245 |
| Example 26 | 17.9 | FR-4 | 3.6 | V-0 | 264 |
| Example 27 | 22.5 | FR-4/TNPP (weight ratio = 1/1) | 9.5 | V-1 | 280 |
| Example 28 | 27.0 | TNPP | 11.8 | V-1 | 298 |

TABLE 7

|  |  | Ex. 29 | Ex. 30 | Ex. 31 | Ex. 32 | Ex. 33 | Ex. 34 |
|---|---|---|---|---|---|---|---|
| Resin composition | | | | | | | |
| (A) PC (parts by weight) | | | | | 63 | | |
| (B) HIPS (parts by weight) | | | | | 24 | | |
| GPPS (parts by weight) | | | | | 3 | | |
| (C) AS-1 (parts by weight) | | | | | 3 | | |
| (D) PPE (parts by weight) | | | | | 7 | | |
| Component (E) | | | | | | | |
| FR-2[*1] (parts by weight) | | 13 | 17 | 20 | 0 | 0 | 0 |
| FR-4[*2] (parts by weight) | | 0 | 0 | 0 | 13 | 17 | 20 |
| Properties | | | | | | | |
| Izod impact strength (kg · cm/cm) | | 4.9 | 3.5 | 1.0 | 6.9 | 5.9 | 5.1 |

TABLE 7-continued

|  | Ex. 29 | Ex. 30 | Ex. 31 | Ex. 32 | Ex. 33 | Ex. 34 |
| --- | --- | --- | --- | --- | --- | --- |
| MFR (g/10 min) | 40 | 58 | 75 | 48 | 74 | 108 |
| Vicat softening temperature (° C.) | 112 | 104 | 99 | 107 | 100 | 96 |
| Flame retardancy (UL-94) | V-0 | V-0 | V-0 | V-0 | V-0 | V-0 |

Note:
*[1]FR-2 is aromatic phosphate condensate
*[2]FR-4 is aromatic phosphate monomer substituted with alkyl group

TABLE 8

|  | Ex. 10 | Ex. 35 | Ex. 36 | Ex. 3 |
| --- | --- | --- | --- | --- |
| Resin composition |  |  |  |  |
| (A) PC (parts by weight) |  |  | 50 |  |
| (B) HIPS (parts by weight) |  |  | 27 |  |
| GPPS (parts by weight) |  |  | 2.4 |  |
| (C) AS-1 (parts by weight) |  |  | 5 |  |
| (D) PPE (parts by weight) |  |  | 5.6 |  |
| (E) TPP (parts by weight) |  |  | 10 |  |
| Ultraviolet light absorber (UVA) (parts by weight) |  |  | 0.6 | 0.6 |
| Antioxidant (AO) (parts by weight) |  |  |  | 0.3 |
| Sunproofing agent (TiO$_2$) (parts by weight) | 0 | 1 | 1 | 1 |
| Light resistance evaluated according to color difference ΔE* (exposure time: 300 hr) | 10.6 | 7.7 | 2.3 | 2.1 |

Note
*The smaller the color difference, the higher the light resistance

TABLE 9

|  | Ex. 38 | Ex. 39 | Ex. 40 | Ex. 41 |
| --- | --- | --- | --- | --- |
| Masterbatch of PTFE |  |  |  |  |
| Designation | F-MB-1 | F-MB-2 | F-MB-3 | — |
| HIPS (parts by weight) | 0 | 0 | 98 | 0 |
| GPPS (parts by weight) | 29 | 29 | 0 | 0 |
| FPE (parts by weight) | 69 | 69 | 0 | 0 |
| PTFE (parts by weight) | 1 | 1 | 1 | 100 |
| EBS (parts by weight) | 1 | 0 | 1 | 0 |
| Production conditions | Melting at 330° C. for 10 min | Melting at 330° C. for 10 min | Melting at 230° C. for 10 min | — |
| Flame retardancy |  |  |  |  |
| Average flame-out time (sec) | 2.4 | 4.0 | 4.4 | 6.0 |
| Maximum flame-out time (sec) | 9.6 | 9.9 | 17.3 | 29.1 |
| Dripping of flaming particles | Not observed | Not observed | Not observed | Not observed |
| Evaluation according to UL-94 | V–0 | V–0 | V–1 | V–1 |

INDUSTRIAL APPLICABILITY

In the resin composition of the present invention, an aromatic polycarbonate and a rubber-modified styrene polymer, which are poor in compatibility, are effectively rendered compatible with each other by the use of a specific compatibility agent, so that a high impact strength, a high melt flowability (a criterion for molding processability) and a high heat resistance of the resin composition can be achieved.

The resin composition of the present invention is useful in various fields, especially suitable for producing parts for household electrical appliances, office automation machines, and the like.

We claim:
1. An aromatic polycarbonate-styrene polymer resin composition comprising:
   (A) 10 to 90 parts by weight of an aromatic polycarbonate;
   (B) 5 to 85 parts by weight of a rubber-modified styrene polymer comprising a styrene polymer matrix and rubber particles dispersed therein, said styrene polymer not containing an unsaturated nitrile monomer; and
   (C) 0.1 to 50 parts by weight of at least one compatibility agent selected from the group consisting of:
      (a) a copolymer comprising an aromatic vinyl monomer and a comonomer copolymerizable with said aromatic vinyl monomer; and
      (b) a graft copolymer comprising a rubbery polymer having a glass transition temperature (Tg) of –30° C. or lower and, grafted thereon, an aromatic vinyl monomer (1) and a monomer (2) copolymerizable with said aromatic vinyl monomer (1), wherein each of said monomers (1) and (2) is individually in the form of a homopolymer thereof, and/or said monomers (1) and (2) are copolymerized with each other,
   said copolymer as compatibility agent (C) having a non-uniform distribution with respect to the proportions of component monomers constituting said copolymer, so that said copolymer comprises copolymer molecules having different solubility parameter (SP) values, wherein the difference in SP value between the copolymer molecule having a maximum SP value and the copolymer molecule having a minimum SP value is from 0.3 to 1.0 $[(cal/cm^3)^{1/2}]$, and wherein said copolymer has an average SP value of from 10.6 to 11.0 $[(cal/cm^3)^{1/2}]$.
2. The resin composition according to claim 1, wherein said comonomer copolymerizable with said aromatic vinyl monomer in said compatibility agent is at least one member selected from the group consisting of an unsaturated nitrile monomer, an acrylic ester monomer, a methacrylic ester monomer, an acrylic acid monomer, a methacrylic acid monomer, an α,β-unsaturated carboxylic acid anhydride monomer and a maleimide monomer.
3. The resin composition according to claim 1, which further comprises (D) 1 to 30 parts by weight of a polyphenylene ether.
4. The resin composition according to claim 1, which further comprises (E) 1 to 30 parts by weight of a flame retardant.
5. The resin composition according to claim 4, wherein said flame retardant (E) is a mixture of aromatic phosphates represented by formula (I):

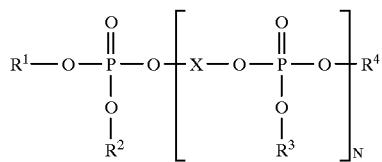

wherein each of $R^1$, $R^2$, $R^3$ and $R^4$ independently represents an unsubstituted or substituted aromatic group having 6 to 20 carbon atoms; X represents an unsubstituted or substituted arylene group having 6 to 25 carbon atoms; and N is an integer and has an average value of from 0 to 0.9, wherein said average value of N is defined by formula (II):

$$\text{Average value of } N = \Sigma Nixi/\Sigma xi \qquad (II)$$

wherein Ni represents the N value of an i-th phosphate molecule of formula (I) and xi represents the weight ratio of said i-th phosphate molecule.

6. The resin composition according to claim 5, wherein the average value of N of formula (I) is 0, and the total number of carbon atoms of all substituent groups substituted at the aromatic rings in $R^1$, $R^2$ and $R^4$ is 10 to 20.

7. The resin composition according to claim 4, which further comprises (F) 0.001 to 30 parts by weight of a flame retardant auxiliary comprising a fluororesin in a branched fibril form, said branched fibril comprising an oriented trunk fiber having a diameter of 0.1 μm or more and at least one branch fiber, branched from said trunk fiber, per 1 μm of the length thereof in the direction of orientation, having a diameter of 0.1 μm or more.

* * * * *